US012786938B2

(12) United States Patent
Ren et al.

(10) Patent No.: US 12,786,938 B2
(45) Date of Patent: Nov. 3, 2026

(54) METHOD AND APPARATUS FOR TRANSMITTING LOS/NLOS INDICATION INFORMATION, METHOD AND APPARATUS FOR RECEIVING LOS/NLOS INDICATION INFORMATION

(71) Applicant: DATANG MOBILE COMMUNICATIONS EQUIPMENT CO., LTD., Beijing (CN)

(72) Inventors: Xiaotao Ren, Beijing (CN); Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 311 days.

(21) Appl. No.: 18/696,261

(22) PCT Filed: Sep. 28, 2022

(86) PCT No.: PCT/CN2022/122161
§ 371 (c)(1),
(2) Date: Mar. 27, 2024

(87) PCT Pub. No.: WO2023/051613
PCT Pub. Date: Apr. 6, 2023

(65) Prior Publication Data

US 2025/0048311 A1 Feb. 6, 2025

(30) Foreign Application Priority Data

Sep. 30, 2021 (CN) .......................... 202111161352.1

(51) Int. Cl.
*H04W 64/00* (2009.01)
*H04L 5/00* (2006.01)
*H04W 56/00* (2009.01)

(52) U.S. Cl.
CPC .......... *H04W 64/00* (2013.01); *H04L 5/0051* (2013.01); *H04W 56/0015* (2013.01)

(58) Field of Classification Search
CPC ... H04W 64/00; H04W 56/0015; H04W 4/02; H04L 5/0051; H04L 5/005; G01S 5/0036; G01S 5/0218; G01S 5/10
(Continued)

(56) References Cited

U.S. PATENT DOCUMENTS

2010/0323718 A1* 12/2010 Jen ........................ H04W 64/00 455/456.1
2014/0126530 A1* 5/2014 Siomina ................ H04L 5/0073 370/330
(Continued)

FOREIGN PATENT DOCUMENTS

CN 109597023 A 4/2019
CN 112839377 A 5/2021
(Continued)

OTHER PUBLICATIONS

Supplementary European Search Report in the corresponding EP patent Application No. 22874996.6, issued Dec. 13, 2024.
(Continued)

*Primary Examiner* — Don N Vo
(74) *Attorney, Agent, or Firm* — Ladas & Parry, LLP

(57) ABSTRACT

Provided are a method and an apparatus for transmitting LOS/NLOS indication information, and a method and an apparatus for receiving LOS/NLOS indication information. The method includes: transmitting, by a first device, LOS/NLOS indication information corresponding to a positioning measurement quantity to a positioning server, wherein the first device includes at least one device of a UE, a base station, or a transmit and receive point (TRP), the LOS/NLOS indication information is used to indicate a LOS or
(Continued)

NLOS attribute of a radio link associated with the positioning measurement quantity, and the LOS or NLOS attribute includes at least one of the following: a LOS, an NLOS, a probability of LOS or a probability of NLOS.

20 Claims, 5 Drawing Sheets

(58) Field of Classification Search
USPC .................................................. 455/456.1
See application file for complete search history.

(56) References Cited

U.S. PATENT DOCUMENTS

| | | | | |
|---|---|---|---|---|
| 2022/0334213 | A1 | 10/2022 | Wang et al. | |
| 2023/0089198 | A1* | 3/2023 | Choi | H04W 64/006 455/456.1 |
| 2023/0345407 | A1 | 10/2023 | Li et al. | |
| 2024/0023056 | A1* | 1/2024 | Li | H04W 4/025 |
| 2024/0057028 | A1* | 2/2024 | Hao | H04W 64/006 |

FOREIGN PATENT DOCUMENTS

| | | | |
|---|---|---|---|
| CN | 113194531 | A | 7/2021 |
| CN | 113676832 | A | 11/2021 |
| WO | 2021160434 | A1 | 8/2021 |

OTHER PUBLICATIONS

"Views on LoS/NLOS Identification and Mitigation," 3GPP TSG RAN WG1 #106-e, R1-2107061, Nokia et al., Aug. 6, 2021.
International Search Report for International Patent Application No. PCT/CN2022/122161 issued by the International Patent Office on Dec. 21, 2022 and its English Translation provided by WIPO.
Written Opinion for International Patent Application No. PCT/CN2022/122161 issued by the International Patent Office on Dec. 21, 2022 and its English Translation provided by WIPO.
InterDigital, Inc.: "Discussion on multipath/NLOS mitigation for positioning"; 3GPP TSG RAN WG1 #106-e; R1-2107648; e-Meeting, Aug. 16-27, 2021, available at Aug. 7, 2021.

* cited by examiner

METHOD AND APPARATUS FOR TRANSMITTING LOS/NLOS INDICATION INFORMATION, METHOD AND APPARATUS FOR RECEIVING LOS/NLOS INDICATION INFORMATION

CROSS-REFERENCE TO RELATED APPLICATIONS

This application is the U.S. national phase of International Application No. PCT/CN2022/122161, filed on Sep. 28, 2022, which claims a priority to Chinese Patent Application No. 202111161352.1 filed on Sep. 30, 2021, the disclosures of which are incorporated by reference herein in their entireties.

TECHNICAL FIELD

The present disclosure relates to the field of mobile communication technology, in particular to a method and an apparatus for transmitting indication information of line of sight (Line Of Sight, LOS) or non line of sight (Non Line Of Sight, NLOS), a method and an apparatus for receiving LOS/NLOS indication information.

BACKGROUND

Positioning by using a mobile communication base station or a transmit and receive point (Transmit and Receive Point, TRP) is a new direction in the development of mobile communication applications in recent years. At present, positioning for a terminal has been widely used in various application scenarios such as navigation and range finding. How to further improve the positioning accuracy of a location of the terminal has been a research issue in the industry.

SUMMARY

According to one aspect of the present disclosure, at least one embodiment provides a method for transmitting LOS/NLOS indication information, including: transmitting, by a first device, LOS/NLOS indication information corresponding to a positioning measurement quantity to a positioning server, where the first device includes at least one device of a user equipment (UE), a base station, or a transmit and receive point (TRP), the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

Further, according to at least one embodiment of the present disclosure, the method further includes: transmitting, by the first device, the positioning measurement quantity to the positioning server, where the positioning measurement quantity and the LOS/NLOS indication information corresponding to the positioning measurement quantity are used for positioning by the positioning server.

Further, according to at least one embodiment of the present disclosure, the transmitting, by the first device, the LOS/NLOS indication information corresponding to the positioning measurement quantity to the positioning server includes: for one positioning measurement quantity, transmitting, by the first device, at least two pieces of LOS/NLOS indication information corresponding to the positioning measurement quantity to the positioning server, where the positioning measurement quantity is associated with at least two measurement objects, and each piece of LOS/NLOS indication information is associated with a radio link associated with one of the measurement objects.

Further, according to at least one embodiment of the present disclosure, the positioning measurement quantity is a downlink reference signal time difference (DL-RSTD) measurement quantity; the at least two measurement objects include: a reference measurement object and a relative measurement object; where the reference measurement object is a reference TRP, and the relative measurement object is a measurement TRP; or, the reference measurement object is a reference time, and the relative measurement object is a measurement time or downlink time difference of arrival (DL-TDOA).

Further, according to at least one embodiment of the present disclosure, the method further includes: when transmitting at least one positioning measurement quantity, transmitting LOS/NLOS indication information of a radio link associated with a same reference measurement object to the positioning server, and for each of the relative measurement object, transmitting one piece of LOS/NLOS indication information of a radio link associated with the relative measurement object.

Further, according to at least one embodiment of the present disclosure, LOS/NLOS indication information of a radio link associated with the reference measurement object is carried in a first information element (IE), and the first information element (IE) includes signal measurement information NR-DL-TDOA-SignalMeasurementInformation-r17; LOS/NLOS indication information of a radio link associated with a first relative measurement object is carried in a measurement element signaling NR-DL-TDOA-MeasElement-r17; and LOS/NLOS indication information of radio links associated with the remaining relative measurement objects are carried in an additional measurement element signaling NR-DL-TDOA-AdditionalMeasurements-r17.

Further, according to at least one embodiment of the present disclosure, the positioning measurement quantity is a measurement quantity of a reception-transmission time difference of the UE; and the at least two measurement objects include: a first downlink positioning reference signal (DL-PRS) and a first sounding reference signal for positioning (SRS-Pos).

Further, according to at least one embodiment of the present disclosure, the transmitting, by the first device, the at least two pieces of LOS/NLOS indication information corresponding to the positioning measurement quantity to the positioning server includes: transmitting, by the UE, LOS/NLOS indication information of a radio link associated with the first DL-PRS to the positioning server, and transmitting, by the TRP, LOS/NLOS indication information of a radio link associated with the first SRS-Pos to the positioning server.

Further, according to at least one embodiment of the present disclosure, the positioning measurement quantity is a measurement quantity of a reception-transmission time difference of the TRP; and the at least two measurement objects include: a second DL-PRS and a second SRS-Pos.

Further, according to at least one embodiment of the present disclosure, the transmitting, by the first device, the at least two pieces of LOS/NLOS indication information corresponding to the positioning measurement quantity to the positioning server includes: transmitting, by the UE, LOS/NLOS indication information of a radio link associated with the second DL-PRS to the positioning server, and transmitting, by the TRP, LOS/NLOS indication information of a radio link associated with the second SRS-Pos to the positioning server.

Further, according to at least one embodiment of the present disclosure, the transmitting, by the first device, the LOS/NLOS indication information corresponding to the positioning measurement quantity to the positioning server includes: when transmitting at least one positioning measurement quantity, generating one piece of first LOS/NLOS indication information based on LOS/NLOS indication information corresponding to the at least one positioning measurement quantity, and transmitting the same to the positioning server.

Further, according to at least one embodiment of the present disclosure, the generating one piece of first LOS/NLOS indication information based on the LOS/NLOS indication information corresponding to the at least one positioning measurement quantity includes any one of the following:

in a case that the LOS or NLOS attribute is the probability of LOS or the probability of NLOS, a probability indicated by the first LOS/NLOS indication information is positively correlated with a minimum value of the probability of LOS, or is positively correlated with a maximum value of the probability of NLOS;

in a case that the LOS or NLOS attribute is the LOS or the NLOS, only when all pieces of LOS/NLOS indication information corresponding to the at least one positioning measurement quantity indicate the LOS, the first LOS/NLOS indication information indicates the LOS; otherwise, the first LOS/NLOS indication information indicates the NLOS;

in a case that the LOS or NLOS attribute is the probability of LOS or the probability of NLOS, a probability indicated by the first LOS/NLOS indication information is a preset function with the LOS/NLOS indication information corresponding to the at least one positioning measurement quantity as a variable.

Further, according to at least one embodiment of the present disclosure, the method further includes: transmitting, by the first device, first indication information to the positioning server, where the first indication information is used to indicate that the LOS/NLOS indication information is a hard value or a soft value, the hard value includes that the LOS or NLOS attribute is the LOS or the NLOS, and the soft value includes that the LOS or NLOS attribute is the probability of LOS or the probability of NLOS.

Further, according to at least one embodiment of the present disclosure, a value range of the LOS/NLOS indication information includes: at least one of 0, 1, or null, where, 0 indicates the LOS and 1 indicates the NLOS, or, 0 indicates the NLOS and 1 indicates the LOS; the null indicates that the LOS or NLOS attribute is unknown.

Further, according to at least one embodiment of the present disclosure, in a case that the LOS/NLOS indication information is a soft value, the LOS/NLOS indication information is indicated by using N bits, and N is a preset positive integer; each value of the N bits corresponds to one of $2^N$ values or subintervals within an interval [0, 1]; in a case that the soft value is the probability of LOS, the probability of LOS is positively correlated with the soft value; in a case that the soft value is the probability of NLOS, the probability of NLOS is positively correlated with the soft value.

Further, according to at least one embodiment of the present disclosure, each value or each subinterval within the interval [0, 1] is predefined, and a correspondence between values of the N bits and values or subintervals in the interval [0, 1] is also predefined.

Further, according to at least one embodiment of the present disclosure, the method further includes: transmitting, by the first device, second indication information to the positioning server, where the second indication information is used to indicate a confidence level of the LOS/NLOS indication information.

Further, according to at least one embodiment of the present disclosure, the confidence level is indicated by using M bits, and M is a preset positive integer; each value of the M bits corresponds to one of $2^M$ values in an interval [0%, 100%].

Further, according to at least one embodiment of the present disclosure, each value in the interval [0%, 100%] is predefined, and a correspondence between all values of the M bits and all values in the interval [0%, 100%] is also predefined.

Further, according to at least one embodiment of the present disclosure, the LOS/NLOS indication information is associated with all positioning measurement quantities of one UE-TRP pair, and the UE-TRP pair includes one UE and one TRP.

According to another aspect of the present disclosure, at least one embodiment provides a method for receiving LOS/NLOS indication information, including: receiving, by a positioning server, the LOS/NLOS indication information corresponding to a positioning measurement quantity transmitted by a first device, where the first device includes at least one device of a UE, a base station, or a TRP, the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

Further, according to at least one embodiment of the present disclosure, the method further includes: receiving, by the positioning server, the positioning measurement quantity transmitted by the first device; and performing positioning, by the positioning server, according to the positioning measurement quantity and the LOS/NLOS indication information corresponding to the positioning measurement quantity.

Further, according to at least one embodiment of the present disclosure, the receiving the LOS/NLOS indication information corresponding to the positioning measurement quantity transmitted by the first device includes: receiving at least two pieces of LOS/NLOS indication information corresponding to one positioning measurement quantity transmitted by the first device for the positioning measurement quantity, where the positioning measurement quantity is associated with at least two measurement objects, and each piece of LOS/NLOS indication information is associated with a radio link associated with one of the measurement objects.

Further, according to at least one embodiment of the present disclosure, the positioning measurement quantity is a DL-RSTD measurement quantity; and the at least two measurement objects include: a reference measurement object and a relative measurement object; where the reference measurement object is a reference TRP, and the relative measurement object is a measurement TRP; or, the reference measurement object is a reference time, and the relative measurement object is a measurement time or downlink time difference of arrival (DL-TDOA).

Further, according to at least one embodiment of the present disclosure, the receiving the LOS/NLOS indication information corresponding to the positioning measurement quantity transmitted by the first device further includes: when receiving at least one positioning measurement quantity, receiving, from the first device, LOS/NLOS indication information of a radio link associated with a same reference measurement object, and receiving, from the first device for each relative measurement object, one piece of LOS/NLOS indication information of a radio link associated with the relative measurement object.

Further, according to at least one embodiment of the present disclosure, the positioning measurement quantity is a measurement quantity of a reception-transmission time difference of the UE; and the at least two measurement objects include: a first DL-PRS and a first SRS-Pos.

Further, according to at least one embodiment of the present disclosure, the receiving at least two pieces of LOS/NLOS indication information corresponding to one positioning measurement quantity transmitted by the first device for the positioning measurement quantity includes: receiving LOS/NLOS indication information of a radio link associated with the first DL-PRS transmitted by the UE, and receiving LOS/NLOS indication information of a radio link associated with the first SRS-Pos transmitted by the TRP.

Further, according to at least one embodiment of the present disclosure, the positioning measurement quantity is a measurement quantity of a reception-transmission time difference of the TRP; and the at least two measurement objects include: a second DL-PRS and a second SRS-Pos.

Further, according to at least one embodiment of the present disclosure, the receiving at least two pieces of LOS/NLOS indication information corresponding to one positioning measurement quantity transmitted by the first device for the positioning measurement quantity includes: receiving LOS/NLOS indication information of a radio link associated with the second DL-PRS transmitted by the UE, and receiving LOS/NLOS indication information of a radio link associated with the second SRS-Pos transmitted by the TRP.

Further, according to at least one embodiment of the present disclosure, the receiving the LOS/NLOS indication information corresponding to the positioning measurement quantity transmitted by the first device includes: when receiving at least one positioning measurement quantity, receiving first LOS/NLOS indication information transmitted by the first device, where the first LOS/NLOS indication information is generated based on LOS/NLOS indication information corresponding to the at least one positioning measurement quantity.

Further, according to at least one embodiment of the present disclosure, the method further includes: receiving first indication information transmitted by the first device, where the first indication information is used to indicate that the LOS/NLOS indication information is a hard value or a soft value, the hard value includes that the LOS or NLOS attribute is the LOS or the NLOS, and the soft value includes that the LOS or NLOS attribute is the probability of LOS or the probability of NLOS.

Further, according to at least one embodiment of the present disclosure, the method further includes: receiving second indication information transmitted by the first device, where the second indication information is used to indicate a confidence level of the LOS/NLOS indication information.

Further, according to at least one embodiment of the present disclosure, the method further includes: the LOS/NLOS indication information is associated with all positioning measurement quantities of one UE-TRP pair, and the UE-TRP pair includes one UE and one TRP.

According to another aspect of the present disclosure, at least one embodiment provides a first device, where the first device includes at least one device of a UE, a base station, or a transmit and receive point (TRP), and the first device includes a memory, a transceiver and a processor,

- the memory is configured to store a computer program;
- the transceiver is configured to transmit and receive data under the control of the processor;
- the processor is configured to read the computer program in the memory to perform the following operations:
- transmitting LOS/NLOS indication information corresponding to a positioning measurement quantity to a positioning server, where the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

According to another aspect of the present disclosure, at least one embodiment provides a first device. The first device includes at least one device of a UE, a base station, or a transmit and receive point (TRP), and the first device further includes: a first transmitting unit, configured to transmit LOS/NLOS indication information corresponding to a positioning measurement quantity to a positioning server, where the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

According to another aspect of the present disclosure, at least one embodiment provides a positioning server, including a memory, a transceiver and a processor,

- the memory is configured to store a computer program;
- the transceiver is configured to transmit and receive data under the control of the processor;
- the processor is configured to read the computer program in the memory to perform the following operations:
- receiving LOS/NLOS indication information corresponding to a positioning measurement quantity transmitted by a first device, where the first device includes at least one device of a UE, a base station, or a TRP, the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

According to another aspect of the present disclosure, at least one embodiment provides a positioning server, including: a first receiving unit, configured to receive LOS/NLOS indication information corresponding to a positioning measurement quantity transmitted by a first device, where the first device includes at least one device of a UE, a base station, or a TRP, the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

According to another aspect of the present disclosure, at least one embodiment provides a processor readable storage medium. The processor readable storage medium stores a computer program, and the computer program is configured to cause a processor to execute the above-mentioned methods.

BRIEF DESCRIPTION OF THE DRAWINGS

Through the detailed description mentioned hereinafter, the and other advantages and benefits will be apparent to a person skilled in the art. The following drawings are for illustrative purposes only, but shall not be construed as limiting the present disclosure. In the drawings, a same reference numeral represents a same member. In the drawings.

DETAILED DESCRIPTION

Figure 1:
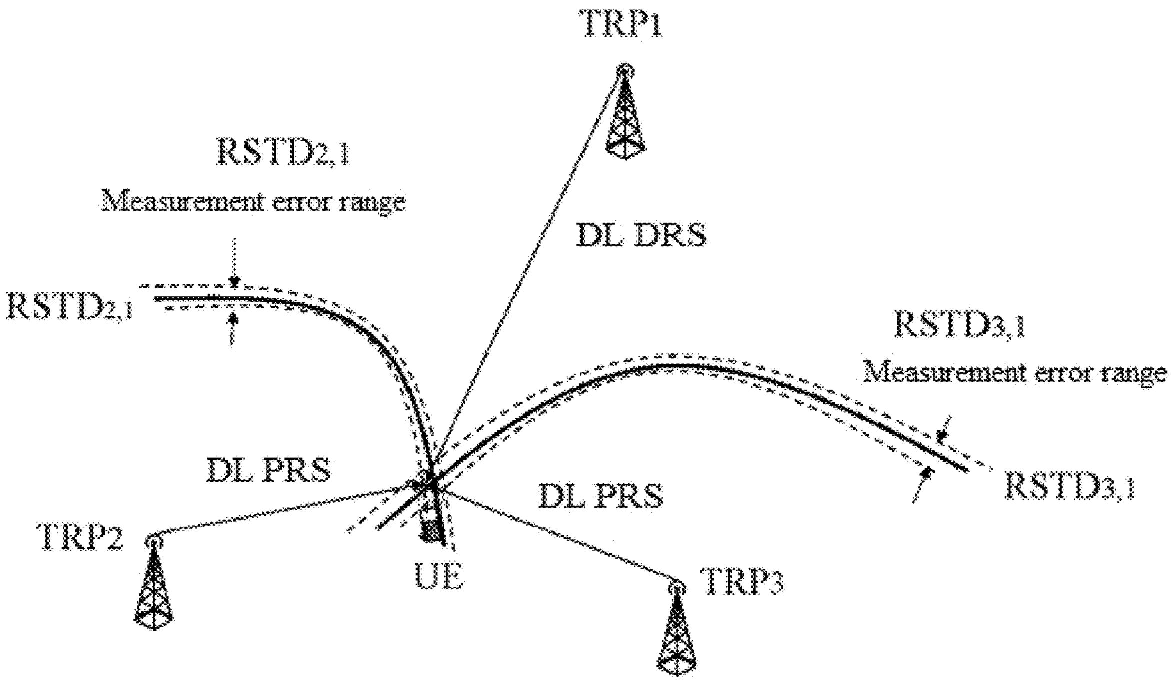
FIG. 1 is an example diagram of 2D UE positioning using NR DL-TDOA.

Exemplary embodiments of the present disclosure are described hereinafter in more detail with reference to the accompanying drawings. Although the drawings show the exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

Terms such as "first" and "second" in the specification and the claims of the present disclosure are used to distinguish similar objects and are not necessarily used to describe a specific order or sequence. It should be understood that the terms used in this way may be interchanged under appropriate circumstances, so that the embodiments of the present disclosure described herein may be implemented in a sequence other than those illustrated or described herein. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device. The term "and/or" used in the specification and the claims indicates involving at least one of connected objects.

Technologies described in this specification are not limited to NR systems and long term evolution (Long Time Evolution, LTE)/LTE-advanced (LTE-Advanced, LTE-A) systems, but may also be applied to various radio communications systems such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-Carrier Frequency-Division Multiple Access, SC-FDMA) and other systems. The terms "system" and "network" are often used interchangeably. The CDMA system may implement radio technologies such as CDMA2000 and universal terrestrial radio access (Universal Terrestrial Radio Access, UTRA). UTRA includes wideband CDMA (Wideband Code Division Multiple Access, WCDMA) and other variants of CDMA. The TDMA system may implement radio technologies such as global system for mobile communication (Global System for Mobile Communication, GSM). The OFDMA system may implement radio technologies such as ultra mobile broadband (Ultra Mobile Broadband, UMB), evolved UTRA (Evolution-UTRA, E-UTRA), IEEE 802.11 (Wi-Fi), IEEE 802.16 (WiMAX), IEEE 1102.20, and Flash-OFDM. UTRA and E-UTRA are parts of a universal mobile telecommunications system (Universal Mobile Telecommunications System, UMTS). LTE and more advanced LTE (such as LTE-A) are new UMTS versions using E-UTRA. UTRA, E-UTRA, UMTS, LTE, LTE-A, and GSM are described in documents from an organization named "3rd Generation Partnership Project" (3rd Generation Partnership Project, 3GPP). CDMA2000 and UMB are described in documents from an organization named "3rd Generation Partnership Project 2" (3GPP2). The technologies described in this specification may be used for the above systems and radio technologies, and may also be used for other systems and radio technologies. However, in the following descriptions, an NR system is described for an illustration purpose and NR terms are used in most of the following descriptions, although these technologies may also be applied to other applications than the NR system application.

Following descriptions are used to provide examples and are not intended to limit the scope, applicability, or configuration described in the claims. Functions and arrangements of discussed elements may be changed without departing from the spirit and scope of the present disclosure. Various examples may be omitted or replaced properly, or various procedures or components may be added. For example, the described method may be performed in an order different from the described order, and steps may be added, omitted, or combined. In addition, features described with reference to a certain example may be combined in another example.

A downlink time difference of arrival (Downlink-Time Difference Of Arrival, DL-TDOA) positioning method is an important positioning method among the positioning methods in the related art. The working principle of the DL-TDOA positioning method includes: multiple transmit and receive point points (Transmit and Receive Point, TRP) transmit downlink positioning reference signals (Downlink Positioning Reference Signal, DL-PRS), a UE can receive the signals from the multiple TRPs, the UE receives and measures time of arrivals (Time Of Arrival, TOA) of DL-PRSs from the multiple TRPs, the UE obtains one downlink reference signal time difference (Downlink-Reference Signal Time Difference, DL-RSTD) by calculating two TOAs, and then reports the DL-RSTD to a location management function (Location Management Function, LMF); the LMF calculates a position of the UE by using multiple DL-RSTDs, and other known information (such as geographic coordinates of the TRPs).

In the DL-TDOA positioning method, the UE learns configuration information of a downlink positioning reference signal (DL-PRS) transmitted by a TRP around the UE according to DL-TDOA assistance data provided by the LMF, receives DL-PRSs transmitted by multiple TRPs, and obtains a DL-PRS reference signal time difference (DL-PRS RSTD). Next, the position of the UE is calculated by using a network-based positioning manner or a UE-based positioning manner based on the DL-PRS RSTD obtained by the UE and other known information (such as the geographic coordinates of the TRPs). In a case that the network-based positioning manner is adopted, the UE reports the obtained DL-PRS RSTD measurement quantity to the LMF, and the LMF uses the reported measurement quantity and other known information (such as the geographical coordinates of the TRPs) to calculate the position of the UE. In a case that the UE-based positioning manner is adopted, the UE uses the DL-PRS RSTD obtained by the UE and other information (such as the geographical coordinates of the TRP) provided by the network to calculate the position of the UE itself.

The Rel-16 new radio (NR) standards do not define a specific algorithm for NR DL-TDOA positioning. Each DL-PRS RSTD measurement quantity is a difference between arrival times of DL-PRSs received by the UE from two TRPs (one of which is a reference TRP). A hyperbola can be formed by measurement quantities of each DL-PRS RSTD (when converted into distances), the focuses of the hyperbola are positions where the two TRPs are located, and a difference of distances between any point on the hyperbola and the two TRPs is a RSTD measurement quantity. The UE is located at one point on the hyperbola. If the UE obtains measurement quantities of N−1 DL-PRS RSTDs from N TRPs, an equation system having N−1 hyperbolic equations can be formed. The position of the UE can be obtained by solving the hyperbolic equation system.

FIG. 1 is an example of 2D UE positioning using NR DL-TDOA. A UE obtains two DL PRS RSTD measurement quantities RTSD2,1 and RTSD3,1 from 3 TRPs (assuming that TRP1 is a reference TRP). Two hyperbolas are formed by RTSD2,1 and RTSD3,1. A position of the UE can be obtained by performing resolving on an intersection of the two hyperbolas.

In general, each DL-PRS RSTD measurement quantity has a certain measurement error. Therefore, when NR DL-TDOA is used for positioning, it is expected that a UE can obtain more RSTD measurement quantities and more accurate RSTD measurement quantities from more TRPs, so as to reduce the impact of measurement errors on UE position calculation and obtain the more accurate position of the UE. This requires reasonable and optimal design of DL-PRS signals (such as signal sequence, mapping mode, mute mode, etc.), so that UE can receive DL-PRS signals from as many TRPs as possible and can obtain accurate RSTD measurement quantities. In addition, the NR DL-TDOA positioning method requires accurate time synchronization among TRPs, and the accuracy of time synchronization among TRPs directly affects the positioning performance of NR DL-TDOA.

As mentioned above, in order to complete the calculation of one DL-RSTD measurement quantity in the DL-TDOA positioning method in the related art, a UE needs to receive DL-PRSs transmitted by two TRPs, and the UE can complete the measurement of two TOAs and the calculation of a final DL-RSTD based on the two DL-PRSs. However, DL-PRSs from two different TRPs may experience two different wireless channels, and LOS/NLOS states of the two different wireless channels may be different, and whether a wireless channel experienced by a positioning reference signal is a line of sight (LOS) or a non-line of sight (NLOS) is important information that an LMF is required to possess to improve the positioning accuracy. Therefore, in view of this situation, it is necessary to solve a problem of how to notify the LMF of LOS/NLOS states of two different wireless channels corresponding to a same DL-RSTD measurement quantity.

In addition, for a measurement quantity of a reception-transmission time difference of a UE, since a time when the UE receives a DL-PRS and a time when the UE transmits a sounding reference signal for positioning (Sounding Reference Signal for Positioning, SRS-Pos) may be quite different from each other, causing that a LOS/NLOS state of a wireless channel carrying the DL-PRS is different from a LOS/NLOS state of a wireless channel carrying the SRS-Pos. Thus, in view of this situation, it is also necessary to solve a problem of how to notify the LMF of LOS/NLOS states of two different wireless channels corresponding to a measurement quantity of a reception-transmission time difference of the same UE. There is also a similar problem with respect to a measurement quantity of a reception-transmission time difference of a gNB node (5G base station) (NR Node B, gNB).

In view of the above problems, an embodiment of the present disclosure provides a method for transmitting LOS indication information. Compared with the related art, by using the solution provided in the embodiments of the present disclosure, a first device (at least one of a UE, a TRP or a base station) can report at least two pieces of LOS/NLOS indication information associated with a certain positioning measurement quantity to a positioning server (such as LMF), to assist the positioning server in positioning of the UE, so that the positioning server can select and use an appropriate positioning measurement quantity or perform compensation based on the at least two pieces of LOS/NLOS indication information when calculating a position of the UE. Therefore, the position of the UE can be estimated more accurately, so as to avoid that the calculation accuracy of the position of the UE is adversely affected by the NLOS, thereby improving the positioning accuracy of the position of the UE estimated by the LMF.

Figure 2:
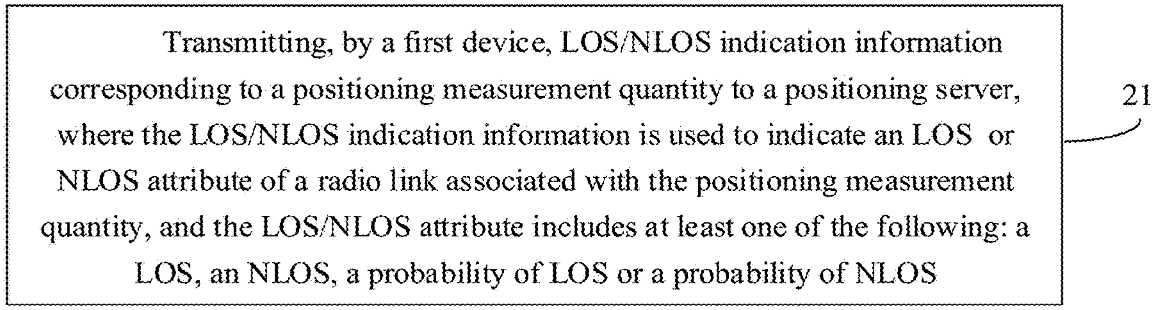
FIG. 2 is a schematic flowchart of a method for transmitting LOS/NLOS indication information according to an embodiment of the present disclosure.

Referring to FIG. 2, the method for transmitting LOS/NLOS indicating information provided by an embodiment of the present disclosure, when applied to a first device side, includes following steps.

Step 21: transmitting, by a first device, line of sight/non line of sight indication information (LOS/NLOS indication information) corresponding to a positioning measurement quantity to a positioning server.

The first device specifically includes at least one device among a UE, a base station, and a transmit and receive point (TRP). The LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

In addition, the first device may also transmit the positioning measurement quantity to the positioning server, so that the positioning server performs the positioning according to the positioning measurement quantity and LOS/NLOS indication information corresponding to the positioning measurement quantity.

Through the above steps in the embodiment of the present disclosure, the first device transmits the LOS/NLOS indication information corresponding to the positioning measurement quantity to the positioning server, to indicate the LOS/NLOS attribute of the radio link associated with the positioning measurement quantity, so as to assist the positioning server in the positioning of the UE. In this way, the positioning server can select to use an appropriate positioning measurement quantity or perform compensation based on the LOS/NLOS indication information when calculating the position of the UE. Therefore, the position of the UE can be estimated more accurately, so as to avoid that the calculation accuracy of the position of the UE is adversely affected by the NLOS, thereby improving the positioning accuracy of the position of the UE estimated by the positioning server.

For example, after obtaining multiple positioning measurement quantities and corresponding LOS/NLOS indication information reported by the first device, the positioning server directly discards a positioning measurement quantity whose LOS/NLOS indication information is NLOS or indicates the probability of NLOS to be greater than a preset probability (for example, 50%). Instead, positioning calculation is performed by only using a positioning measurement quantity whose LOS/NLOS indication information is LOS or indicates the probability of NLOS to be not greater than a preset probability (for example, 50%), which can prevent the NLOS from affecting the calculation accuracy of a position of a UE, thereby improving the positioning accuracy of the LMF when estimating the position of the UE.

Multiple implementations of the above step 21 are given below.

In a first implementation, in an embodiment of the present disclosure, the first device may report multiple pieces of LOS/NLOS indication information for a positioning measurement quantity such as DL RSTD involving multiple TRPs or multiple reference signals.

Specifically, in the above step 21, for one positioning measurement quantity, the first device may transmit at least two pieces of LOS/NLOS indication information corresponding to the positioning measurement quantity to the positioning server, where the positioning measurement quantity is associated with at least two measurement objects, and each piece of LOS/NLOS indication information is associated with a radio link associated with one of the measurement objects.

For example, the positioning measurement quantity may specifically be a DL-RSTD measurement quantity. In this case, the at least two measurement objects include: a reference measurement object and a relative measurement object; where, the reference measurement object is a reference TRP, and the relative measurement object is a measurement TRP; or, the reference measurement object is a reference time, the relative measurement object is a measurement time or a downlink time difference of arrival (DL-TDOA). The reference time refers to a time when a downlink positioning reference signal transmitted by the reference TRP is received.

In addition, in order to reduce the overhead of information transmission, when transmitting at least one positioning measurement quantity (multiple DL-RSTD measurement quantities), the first device may transmit LOS/NLOS indication information of a radio link associated with a same reference measurement object (reference TRP or reference time) to the positioning server, and for each relative measurement object (measurement TRP or DL-TDOA), the first device transmits LOS/NLOS indication information of a radio link associated with the relative measurement object. That is to say, the reference measurement objects associated with the at least one positioning measurement quantity are the same, but the relative measurement objects associated with the at least one positioning measurement quantity are different. In this way, in transmission, the first device may transmit the LOS/NLOS indication information of the radio link associated with the reference measurement object for one time to the positioning server, and may respectively transmit, for all relative measurement objects, multiple pieces of LOS/NLOS indication information of radio links associated with the relative measurement objects, thereby saving the overhead of transmissions of the LOS/NLOS indication information associated with the reference measurement objects.

More specifically, LOS/NLOS indication information of a radio link associated with the reference measurement object is carried in a first information element (IE), and the first information element (IE) includes signal measurement information (NR-DL-TDOA-SignalMeasurementInformation-r17). LOS/NLOS indication information of a radio link associated with a first relative measurement object may be carried in a measurement element signaling (NR-DL-TDOA-MeasElement-r17); LOS/NLOS indication information of radio links associated with the remaining relative measurement objects are carried in an additional measurement element signaling (NR-DL-TDOA-AdditionalMeasurements-r17).

For another example, the positioning measurement quantity may specifically be a measurement quantity of a reception-transmission time difference of a UE. In this case, the at least two measurement objects include: a first DL-PRS and a first SRS-Pos. In the above step 21, the UE may transmit LOS/NLOS indication information of a radio link associated with the first DL-PRS to the positioning server, and a TRP may transmit LOS/NLOS indication information of a radio link associated with the first SRS-Pos to the positioning server.

For another example, the positioning measurement quantity may specifically be a measurement quantity of a reception-transmission time difference of a TRP. In this case, the at least two measurement objects include: a second DL-PRS and a second SRS-Pos. In the above step 21, the UE may transmit LOS/NLOS indication information of a radio link associated with the second DL-PRS to the positioning server, and the TRP may transmit LOS/NLOS indication information of a radio link associated with the second SRS-Pos to the positioning server.

In a second implementation, in an embodiment of the present disclosure, the first device comprehensively calculates multiple pieces of LOS/NLOS indication information into a single piece of LOS/NLOS indication information, for measurement quantities such as DL RSTD involving multiple TRPs or multiple reference signals, and then reports the single piece of LOS/NLOS indication information.

Specifically, in the above step 21, when transmitting multiple positioning measurement quantities, the first device generates one piece of first LOS/NLOS indication information in accordance with LOS/NLOS indication information corresponding to the at least one positioning measurement quantity, and transmit the same to the positioning server.

The generating one piece of first LOS/NLOS indication information in accordance with LOS/NLOS indication information corresponding to at least one positioning measurement quantity includes any of the following.

1) In a case that the LOS or NLOS attribute is a probability of LOS or a probability of NLOS, the probability indicated by the first LOS/NLOS indication information is positively correlated with a minimum value among probabilities of LOS, or is positively correlated with a maximum value among probabilities of NLOS.

In the case of using the probability of LOS as the LOS or NLOS attribute, all pieces of LOS/NLOS indication information corresponding to the at least one positioning measurement quantity are probabilities of LOS, so there are multiple LOS probabilities. When generating the first LOS/NLOS indication information according to the multiple LOS probabilities, a probability indicated by first LOS/NLOS indication information (that is, the probability of LOS) is positively correlated with a minimum value among the multiple LOS probabilities, that is, the smaller the minimum value is, the lower the probability indicated by the first LOS/NLOS indication information is; conversely, the larger the minimum value is, the higher the probability indicated by the first LOS/NLOS indication information is.

Similarly, in the case of using the probability of NLOS as the LOS or NLOS attribute, all pieces of LOS/NLOS indication information corresponding to multiple positioning measurement quantities are probabilities of NLOS, so there are multiple NLOS probabilities. When the first LOS/NLOS indication information is generated according to the multiple NLOS probabilities, the probability indicated by the first LOS/NLOS indication information (that is, the probability of NLOS) is positively correlated with a maximum value among the multiple NLOS probabilities, that is, the smaller the maximum value is, the lower the probability indicated by the first LOS/NLOS indication information is; conversely, the greater the minimum value is, the higher the probability indicated by the first LOS/NLOS indication information is. For example, if a probability (soft value, that is, a value within an interval [0, 1]) used to represent the probability of NLOS is to be reported, the first device may report a NLOS probability that is greatest among the multiple NLOS probabilities.

2) In a case that the LOS or NLOS attribute is the LOS or the NLOS, only when all pieces of LOS/NLOS indication information corresponding to the at least one positioning measurement quantity indicate the LOS, the first LOS/NLOS indication information indicates the LOS; otherwise, the first LOS/NLOS indication information indicates the NLOS.

For example, in a case that a hard value is reported (that is, 0 or 1, used to indicate a LOS or an NLOS), a value corresponding to the LOS is reported only when all pieces of the LOS/NLOS indication information indicate the LOS, otherwise, a value corresponding to the NLOS is reported.

3) In a case that the LOS or NLOS attribute is the probability of LOS or the probability of NLOS, a probability indicated by the first LOS/NLOS indication information is a preset function with the LOS/NLOS indication information corresponding to the at least one positioning measurement quantity as a variable.

For example, a certain function value, such as an average value, with multiple pieces of LOS/NLOS indication information as variables is reported as the LOS/NLOS indication information reported finally.

In an embodiment of the present disclosure, the LOS/NLOS indication information may be indicated by a hard value or a soft value. The hard value specifically includes that the LOS or NLOS attribute is the LOS or the NLOS, and the soft value includes that the LOS or NLOS attribute is the probability of LOS or the probability of NLOS. That is, a hard value usually indicates the LOS or the NLOS directly, while a soft value indicates the probability of LOS or the probability of NLOS. For example, a hard value is 0 or 1, where 0 and 1 indicate LOS and NLOS, or NLOS and LOS, respectively. The soft value is a value within an interval [0, 1], indicating the probability of LOS or the probability of NLOS.

The manner of using a hard value or a soft value may be pre-agreed or predefined, or a notification mechanism may be used for notifying. In a case that the notification mechanism is adopted, in the above method of the embodiments of the present disclosure, the first device may further transmit first indication information to the positioning server, where the first indication information is used to indicate whether the LOS/NLOS indication information is a hard value or a soft value.

Here, regardless of the hard value or the soft value, a value range of the LOS/NLOS indication information generally includes: at least one of 0, 1, or null, where 0 indicates one of LOS and NLOS, 1 indicates the other of LOS and NLOS. That is, 0 indicates the LOS, and 1 indicates the NLOS; or 1 indicates the LOS, and 0 indicates the NLOS; null indicates that the LOS or NLOS attribute is unknown. That is, the first device cannot determine a specific value of the LOS/NLOS indication information.

In a case that the LOS/NLOS indication information is the soft value, the LOS/NLOS indication information may be indicated by using N bits, and N is a preset positive integer; each value of the N bits corresponds to one of $2^N$ values or subintervals within an interval [0, 1]. In a case that the soft value is the probability of LOS, the probability of LOS is positively correlated with the soft value; in a case that the soft value is the probability of NLOS, the probability of NLOS is positively correlated with the soft value. For example, the larger the soft value of the LOS/NLOS indication information is, the higher the probability of LOS is, or the higher the probability of NLOS is.

In addition, if the LOS/NLOS indication information is a soft value, each value or each subinterval within the interval [0, 1] is predefined, and a correspondence between each value of the N bits and one of values or subintervals in the interval [0, 1] is also predefined. For example, it is assumed that 8 possible values in the interval [0,1] are: {0, 0.1, 0.3, 0.5, 0.7, 0.9, 1, NULL}, or, 8 possible subintervals in the interval [0, 1] are: {0, (0,0.1], (0.1,0.3], (0.3,0.5], (0.5,0.7], (0.7,0.9], (0.9,1], NULL}.

In the above method in the embodiments of the present disclosure, the first device may further transmit second indication information to the positioning server, where the second indication information is used to indicate a confidence level of the LOS/NLOS indication information. The confidence level is used to indicate the reliability of the LOS/NLOS indication information, which is used by the positioning server for reference, for example, only retaining received LOS/NLOS indication information whose confidence level is higher than a preset threshold, discarding LOS/NLOS indication information whose confidence level is not higher than the preset threshold, and performing discarding processing on corresponding positioning measurement quantities for the retained LOS/NLOS indication information. For example, a positioning measurement quantity whose the LOS/NLOS indication information is NLOS or NLOS probability of the LOS/NLOS indication information is greater than the preset probability (such as 50%) is directly discarded and not used, and positioning calculation is performed by using only a positioning measurement quantity whose the LOS/NLOS indication information is LOS or NLOS probability of the LOS/NLOS indication information is not greater than the preset probability (such as 50%), so as to avoid that the calculation accuracy of a UE position is adversely affected by the NLOS, thereby improving the positioning accuracy of the UE position estimated by the LMF.

Here, the confidence level may be indicated by using M bits, and M is a preset positive integer; each value of the M bits corresponds to one of $2^M$ values in an interval [0%, 100%]. That is to say, the confidence level is indicated by a percentage, for example, a confidence level 95% for a certain piece of LOS/NLOS indication information reported by a UE corresponds to value 1.

Similarly, each value in the interval [0%, 100%] is predefined, and a correspondence between all values of the M bits and all values in the interval [0%, 100%] is also predefined. For example, eight possible values in the above interval are: {10%, 20%, 30%, 50%, 70%, 80%, 90%, 100%}.

In an embodiment of the present disclosure, the first device may also independently report LOS/NLOS indication information, and in this case, the LOS/NLOS indication information is not dependent on a specific measurement quantity. For example, the first device separately reports line of sight/non line of sight indication information (LOS/NLOS indication information), the LOS/NLOS indication information indicates a probability of LOS (or a probability of NLOS) between a UE and a TRP, is associated with one "UE-TRP pair" composed of one UE and one TRP, and is not associated with a specific positioning measurement quantity, so it is applicable to all positioning measurement quantities. That is, the LOS/NLOS indication information is associated with all positioning measurement quantities of one UE-TRP pair, and the UE-TRP pair includes one UE and one TRP.

In addition, the LOS/NLOS indication information may be transmitted jointly with reception-transmission timing error group (Timing Error Group, TEG) information, or transmitted independently of the TEG information.

The method in the embodiments of the present disclosure has been described above from the side of the first device. Implementation processes will be further described below from the side of a positioning server.

Figure 3:
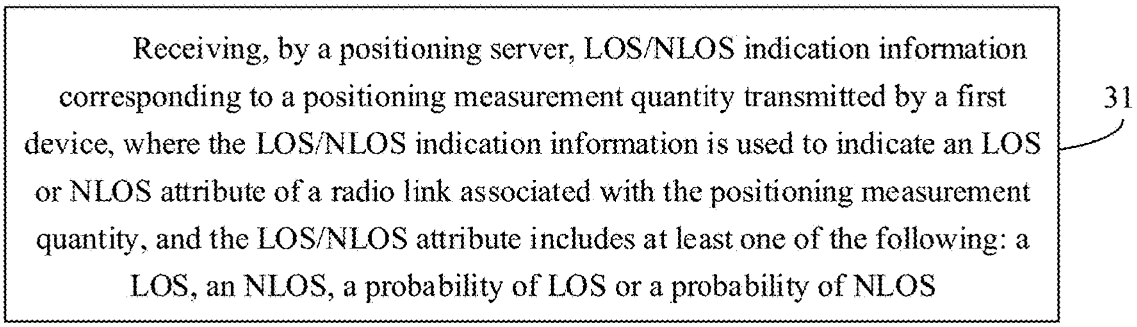
FIG. 3 is a schematic flowchart of a method for receiving LOS/NLOS indication information according to an embodiment of the present disclosure.

Referring to FIG. 3, a method for receiving LOS/NLOS indication information provided by an embodiment of the present disclosure, when applied to a side of a positioning server, includes following steps.

Step 31, receiving, by the positioning server, the LOS/NLOS indication information corresponding to a positioning measurement quantity transmitted by a first device.

The first device includes at least one device of a UE, a base station or a TRP, and the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

In addition, the positioning server may also receive the positioning measurement quantity transmitted by the first device, and then may perform UE positioning according to the positioning measurement quantity and LOS/NLOS indication information corresponding to the positioning measurement quantity.

Through the above steps, the positioning server can obtain the LOS/NLOS indication information corresponding to the positioning measurement quantity, so the positioning server can select to use an appropriate positioning measurement quantity or perform compensation based on the LOS/NLOS indication information when calculating a position of a UE. Therefore, the position of the UE can be estimated more accurately, so as to avoid that the calculation accuracy of the position of the UE is adversely affected by the NLOS, thereby improving the positioning accuracy of the position of the UE estimated by the positioning server.

For example, after obtaining multiple positioning measurement quantities and multiple pieces of corresponding LOS/NLOS indication information reported by the first device, the positioning server directly discards a positioning measurement quantity whose LOS/NLOS indication information is NLOS or NLOS probability of the LOS/NLOS indication information is greater than a preset probability (such as 50%), and only uses a positioning measurement quantity whose LOS/NLOS indication information is LOS or NLOS probability of the LOS/NLOS indication information is not greater than the preset probability (such as 50%) for positioning calculation, which can prevent the NLOS from affecting the calculation accuracy of a UE position, thereby improving the positioning accuracy of the UE position estimated by the LMF.

Corresponding to the above-mentioned first implementation, in the above-mentioned step 31, the positioning server may receive at least two pieces of LOS/NLOS indication information corresponding to one positioning measurement quantity transmitted by the first device for the positioning measurement quantity, where the positioning measurement quantity is associated with at least two measurement objects, and each piece of LOS/NLOS indication information is associated with a radio link associated with one of the measurement objects.

For example, the positioning measurement quantity may specifically be a DL-RSTD measurement quantity. In this case, the at least two measurement objects include: a reference measurement object and a relative measurement object; where, the reference measurement object is a reference TRP, and the relative measurement object is a measurement TRP; or, the reference measurement object is a reference time, the relative measurement object is a measurement time or a downlink time difference of arrival (DL-TDOA). The reference time refers to a time when a downlink positioning reference signal transmitted by the reference TRP is received.

In this way, when receiving at least one positioning measurement quantity of multiple positioning measurement quantities, LOS/NLOS indication information of a radio link associated with a same reference measurement object is received from the first device, and for each relative measurement object, LOS/NLOS indication information of a radio link associated with the relative measurement object is received from the first device.

Specifically, the LOS/NLOS indication information of the radio link associated with the reference measurement object is carried in a first information element (IE), and the first information element (IE) includes signal measurement information (NR-DL-TDOA-SignalMeasurementInformation-r17). LOS/NLOS indication information of a radio link associated with a first relative measurement object may be carried in a measurement element signaling (NR-DL-TDOA-MeasElement-r17); LOS/NLOS indication information of radio links associated with the remaining relative measurement objects are carried in an additional measurement element signaling (NR-DL-TDOA-AdditionalMeasurements-r17).

For another example, the positioning measurement quantity may specifically be a measurement quantity of a reception-transmission time difference of a UE. In this case, the at least two measurement objects include: a first DL-PRS and a first SRS-Pos. In the above step 31, the positioning server may receive LOS/NLOS indication information of a radio link associated with the first DL-PRS transmitted by the UE, and may receive LOS/NLOS indication information of a radio link associated with the first SRS-Pos transmitted by the TRP.

For another example, the positioning measurement quantity may specifically be a measurement quantity of a reception-transmission time difference of a TRP. In this case, the at least two measurement objects include: a second DL-PRS and a second SRS-Pos. In the above step 31, the positioning server may receive LOS/NLOS indication information of a radio link associated with the second DL-PRS transmitted by the UE, and may receive LOS/NLOS indication information of a radio link associated with the second SRS-Pos transmitted by the TRP.

Corresponding to the above second implementation, in the above step 31, the positioning server may receive first LOS/NLOS indication information transmitted by the first device when receiving multiple positioning measurement quantities, where the first LOS/NLOS indication information is generated according to LOS/NLOS indication information corresponding to the multiple positioning measurement quantities.

In a case that the LOS or NLOS attribute is a probability of LOS or a probability of NLOS, the probability indicated by the first LOS/NLOS indication information is positively correlated with a minimum value among probabilities of LOS, or is positively correlated with a maximum value among probabilities of NLOS.

In the case where the LOS or NLOS attribute is a LOS or an NLOS, only when all pieces of LOS/NLOS indication information corresponding to the multiple positioning measurement quantities indicate the LOS, the first LOS/NLOS indication information indicates the LOS; otherwise, the first LOS/NLOS indication information indicates the NLOS.

In the case where the LOS or NLOS attribute is the probability of LOS or the probability of NLOS, a probability indicated by the first LOS/NLOS indication information is a preset function with the LOS/NLOS indication information corresponding to the multiple positioning measurement quantities as variables.

As mentioned above, in the embodiment of the present disclosure, the LOS/NLOS indication information may be indicated by a hard value or a soft value. The positioning server may further receive first indication information transmitted by the first device, where the first indication information is used to indicate that the LOS/NLOS indication information is a hard value or a soft value, the hard value includes that the LOS or NLOS attribute is the LOS or the NLOS, and the soft value includes that that the LOS or NLOS attribute is the probability of the LOS or the probability of the NLOS.

A value range of the LOS/NLOS indication information includes: at least one of 0, 1, or null, where 0 indicates one of LOS and NLOS, and 1 indicates the other of LOS and NLOS, and null indicates that the LOS or NLOS attribute is unknown.

In addition, in a case that the LOS/NLOS indication information is a soft value, the LOS/NLOS indication information uses N bits for indication, and N is a preset positive integer; each value of the N bits corresponds to one of $2^N$ values or subintervals within the interval [0, 1]. In a case that the soft value is the probability of LOS, the probability of LOS is positively correlated with the soft value; in a case that the soft value is the probability of NLOS, the probability of NLOS is positively correlated with the soft value.

Optionally, each value or each subinterval in the interval [0, 1] is predefined, and a correspondence between all values of the N bits and all values or all subintervals in the interval [0, 1] is also predefined.

In an embodiment of the present disclosure, the positioning server may further receive second indication information transmitted by the first device, where the second indication information is used to indicate a confidence level of the LOS/NLOS indication information.

Specifically, the confidence level is indicated by using M bits, and M is a preset positive integer; each value of the M bits corresponds to one of $2^M$ values in an interval [0%, 100%].

Optionally, values in the interval [0%, 100%] are predefined, and a correspondence between all values of the M bits and all values in the interval [0%, 100%] is also predefined.

The confidence level is used to indicate the reliability of the LOS/NLOS indication information, which is used by the positioning server for reference. For example, the positioning server only retains received LOS/NLOS indication information whose confidence level is higher than a preset threshold, discards LOS/NLOS indication information whose confidence level is not higher than the preset threshold, and performs discarding processing on corresponding positioning measurement quantities for the retained LOS/NLOS indication information. For example, a positioning measurement quantity whose the LOS/NLOS indication information is NLOS or NLOS probability of the LOS/NLOS indication information is greater than the preset probability (such as 50%) is directly discarded without using, and positioning calculation is performed by using only a positioning measurement quantity whose the LOS/NLOS indication information is LOS or NLOS probability of the LOS/NLOS indication information is not greater than the preset probability (such as 50%), so as to avoid that the calculation accuracy of a UE position is adversely affected by the NLOS, thereby improving the positioning accuracy of the UE position estimated by the LMF.

In an embodiment of the present disclosure, the LOS/NLOS indication information is associated with all positioning measurement quantities of one UE-TRP pair, and the UE-TRP pair includes one UE and one TRP. Optionally, the LOS/NLOS indication information is transmitted jointly with reception-transmission timing error group (TEG) information, or is transmitted independently of the TEG information.

The above method in the embodiments of the present disclosure will be further described below by giving several more specific examples.

Example 1 (DL-RSTD Measurement Quantity, UE Reports Multiple Pieces of LOS/NLOS Indication Information)

In Example 1, for a DL RSTD positioning measurement quantity, a UE reports two pieces of LOS/NLOS indication information associated with the positioning measurement quantity to a positioning server, and assists the positioning server in completing positioning of the UE. The LOS/NLOS indication information includes at least one piece of information: a LOS, an NLOS, a probability of LOS, or a probability of NLOS of each of radio links corresponding to a reference time and a measurement time of the measurement quantity.

In Example 1, for the DL RSTD positioning measurement quantity:

1) for a reference time or a reference TRP, the UE reports one piece of LOS/NLOS indication information corresponding to the reference time or the reference TRP;
2) for each TDOA measurement quantity or each measurement TRP, the UE reports one piece of LOS/NLOS indication information corresponding to each TDOA measurement quantity or each measurement TRP.

Figure 4:
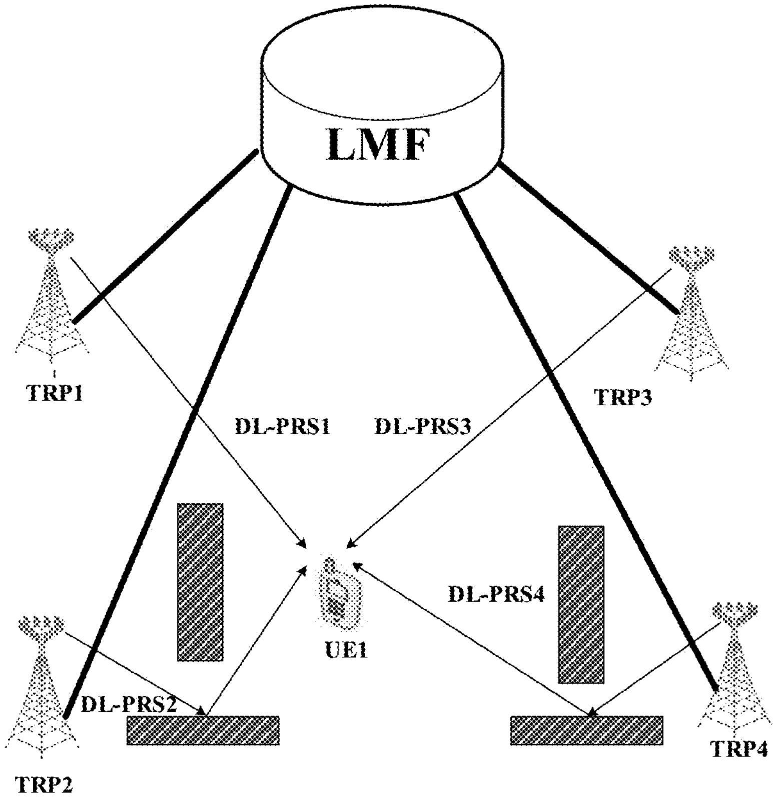
FIG. 4 is a schematic diagram of an application scenario of Example 1 provided by an embodiment of the present disclosure.

Taking FIG. 4 as an example, it is assumed that TRP1 is a reference TRP, and TOA1 obtained by a UE by measuring DL-PRS1 transmitted by TRP1 is a reference time. TOA2 obtained by the UE by measuring DL-PRS2 transmitted by TRP2 is a measurement time. Then, the UE needs to measure and report a positioning measurement quantity DL RSTD2=TOA2−TOA1.

It can be seen from FIG. 4 that for the two downlink positioning reference signals DL-PRS1 and DL-PRS2 received by the UE to calculate the positioning measurement quantity DL RSTD2, wireless channels experienced by them are different. Since there is no obstacle blocking between TRP1 and UE1, there is a line-of-sight propagation path between them, so DL-PRS1 experiences a LOS channel, while there is an obstacle blocking between TRP2 and UE1, there is a non-line-of-sight propagation path between them, so DL-PRS2 experiences a NLOS channel. In this way, TOA1 obtained by measuring DL-PRS1 by UE1 is the reference time, and the corresponding LOS/NLOS indication information is a LOS. The TOA2 obtained by measuring DL-PRS2 by UE1 is the measurement time, and the corresponding LOS/NLOS indication information is a NLOS.

Therefore, for the measurement quantity DL RSTD2, the UE reports two pieces of LOS/NLOS indication information for the measurement quantity, and for a reference time (i.e., TOA1) or a reference TRP (i.e., TRP1), the UE reports one piece of LOS/NLOS indication information (i.e., LOS) corresponding to the reference time or the refer TRP; and for the TDOA measurement quantity (i.e., DL RSTD2) or the measurement TRP (i.e., TRP2), the UE needs to report an additional piece of LOS/NLOS indication information (i.e., NLOS) corresponding to the TDOA measurement quantity (i.e., DL RSTD2) or the measurement TRP (i.e., TRP2).

Similarly, for other TDOA measurement quantities (i.e., DL RSTD3 and DL RSTD4) or measurement TRPs (i.e., TRP3 and TRP4), the UE reports one piece of LOS/NLOS indication information (i.e., LOS, NLOS) corresponding to each TDOA measurement quantity or each measurement TRP.

As can be appreciated, the LOS/NLOS indication information here may also be a probability value of LOS or NLOS instead of deterministic LOS or NLOS information.

By using the method in Example 1, for a DL RSTD positioning measurement quantity, a UE can report two pieces of LOS/NLOS indication information corresponding to a reference time and a measurement time and associated with the positioning measurement quantity to a positioning server LMF. In this way, the LMF can select to use an appropriate positioning measurement quantity or make compensation based on the two pieces of LOS/NLOS indication information when calculating a position of the UE. Therefore, the position of the UE can be estimated more accurately, so as to avoid that the calculation accuracy of the position of the UE is adversely affected by the NLOS, thereby improving the positioning accuracy of the position of the UE estimated by the LMF.

Example 2 (Measurement Quantity of Reception-Transmission Time Difference of UE, UE/TRP Reports Multiple Pieces of LOS/NLOS Indication Information)

In Example 2, for a positioning measurement quantity of a reception-transmission time difference of a UE, the UE or a TRP reports two pieces of LOS/NLOS indication information associated with the positioning measurement quantity to a positioning server, to assist the positioning server in completion of UE positioning. The LOS/NLOS indication information includes at least one piece of information: a LOS, an NLOS, a probability of LOS, or a probability of NLOS of each of radio links corresponding to a transmission time and a reception time of the measurement quantity.

In the embodiment of the present disclosure, for the positioning measurement quantity of the reception-transmission time difference of the UE, the UE reports one piece of LOS/NLOS indication information corresponding to a reception time measured by the UE in receiving a DL-PRS; a TRP reports one piece of LOS/NLOS indication information corresponding to a transmission time measured by the UE in transmitting an SRS-Pos, after receiving the SRS-Pos.

Figure 5:
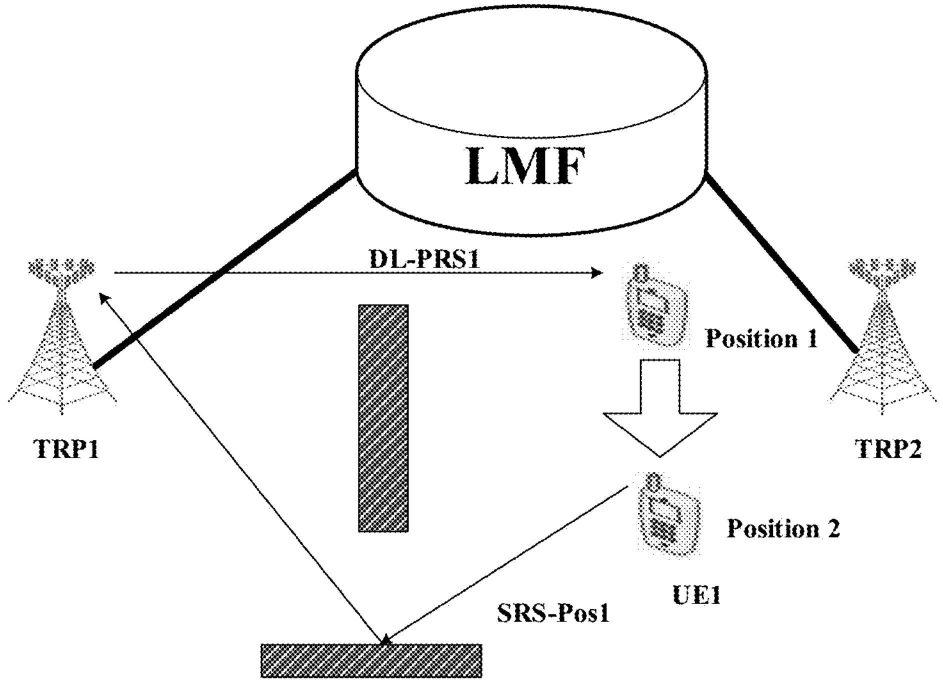
FIG. 5 is a schematic diagram of an application scenario of Example 2 provided by an embodiment of the present disclosure.

Taking FIG. 5 as an example, TRP1 is a TRP related to the positioning measurement quantity of the reception-transmission time difference of the UE, and a reception time of DL-PRS1 obtained by the UE through measuring DL-PRS1 transmitted by TRP1 is TRX, and a transmission time when the UE transmits SRS-Pos1 is TTX. In this case, the positioning measurement quantity that the UE needs to measure and report is the UE reception-transmission time difference=the reception time TRX−the transmission time TTX.

It can be seen from FIG. 5 that since UE1 is in motion, during a time period for measuring the measurement quantity of the reception-transmission time difference of the UE, UE1 moves from “position 1” to “position 2”, and two positioning reference signals DL-PRS1 and SRS-Pos1 used for calculating the positioning measurement quantity of the reception-transmission time difference of the UE experience wireless channels having different conditions. When UE1 receives DL-PRS1, UE1 is located at “position 1”. At this time, there is no obstacle between TRP1 and UE1, and there is a line-of-sight propagation path between them, so DL-PRS1 experiences a LOS channel. When UE1 transmits SRS-Pos1, UE1 is located at “position 2”. At this time, there is an obstacle between TRP1 and UE1, and there is a non-line-of-sight propagation path between them, so SRS-Pos1 experiences an NLOS channel. In this way, the reception time obtained by UE1 in measuring DL-PRS1 is TRX, and the corresponding LOS/NLOS indication information is a LOS. The transmission time corresponding to that UE1 transmits SRS-Pos1 is TTX, and the corresponding LOS/NLOS indication information is a NLOS.

Therefore, for the measurement quantity of the UE reception-transmission time difference, the UE/TRP may report two pieces of LOS/NLOS indication information for the measurement quantity, for the reception time (i.e., TRX), the UE reports one piece of LOS/NLOS indication information (i.e., LOS) corresponding to the reception time; and for the transmission time (i.e., TTX), the TRP needs to report an additional piece of LOS/NLOS indication information (i.e., NLOS) corresponding to the transmission time, after the TRP receives SRS-Pos1.

Similarly, for other measurement quantities of the UE reception-transmission time difference (for example, associated with TRP2), the UE/TRP needs to report one piece of LOS/NLOS indication information corresponding to the reception time and one piece of LOS/NLOS indication information corresponding to the transmission time, respectively.

As can be appreciated, the LOS/NLOS indication information here may also be a probability value of LOS or NLOS, instead of deterministic LOS or NLOS information.

Using the method in the Example 2, for a positioning measurement quantity of a UE reception-transmission time difference, a UE/TRP can report, to a positioning server LMF, two pieces of LOS/NLOS indication information associated with a positioning measurement quantity and corresponding to a reception time and a transmission time. As a result, the LMF can select and use an appropriate positioning measurement quantity or perform compensation based on the at least two pieces of LOS/NLOS indication information when calculating a position of a UE. Therefore, the position of the UE can be estimated more accurately, so as to avoid that the calculation accuracy of the position of the UE is adversely affected by the NLOS, thereby improving the positioning accuracy of the position of the UE estimated by the LMF.

Example 3 (UE Reports a Single Piece of LOS/NLOS Indication Information)

In Example 3, for a certain positioning measurement quantity, a UE or a TRP obtains at least two pieces of LOS/NLOS indication information associated with the positioning measurement quantity. Next, the UE or the TRP obtains a single piece of LOS/NLOS indication information after performing processing and calculating on the at least two pieces of LOS/NLOS indication information, and reports the same to the positioning server, so as to assist the positioning server in completing the UE positioning. The LOS/NLOS indication information includes at least one piece of information: a LOS, an NLOS, a probability of LOS, or a probability of NLOS of a radio link corresponding to a certain measurement quantity in the measurement quantities.

Figure 6:
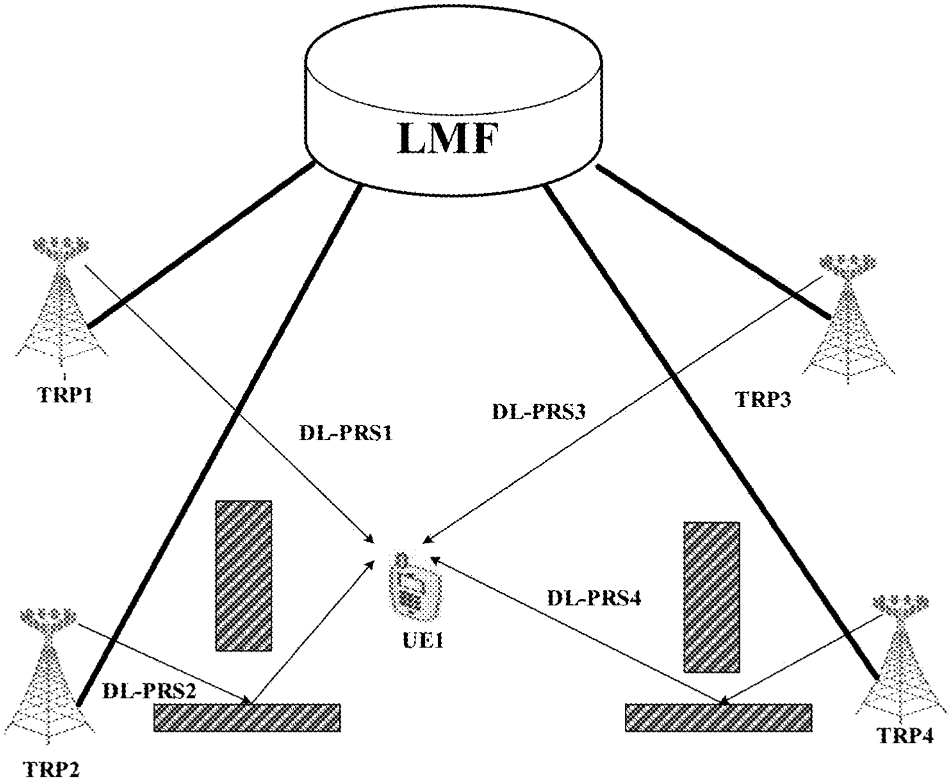
FIG. 6 is a schematic diagram of an application scenario of Example 3 provided by an embodiment of the present disclosure.

For an application scenario shown in FIG. 6, there are the following candidate solutions.

a) Candidate solution 1: in a case that a NLOS probability is reported (soft value, i.e., a value within an interval [0, 1]), a value that is closest to the NLOS probability among the at least two pieces of LOS/NLOS indication information, that is, a value with the highest NLOS probability, is reported.

b) Candidate solution 2: in a case that a hard value (i.e., 0 or 1) is reported, a value corresponding to LOS is reported only when all pieces of LOS/NLOS indication information indicate LOS, otherwise, a value corresponding to the NLOS is reported.

c) Candidate solution 3: a certain function value, such as an average value, with multiple pieces of LOS/NLOS indication information as variables, is reported as the finally reported LOS/NLOS indication information.

With the method in this example, for a DL RSTD positioning measurement quantity, a UE can comprehensively calculate two pieces of LOS/NLOS indication information associated with the positioning measurement quantity and corresponding to a reference time and a measurement time into a single piece of LOS/NLOS indication information, and then can report it to a positioning server LMF, which enables the LMF to select and use an appropriate positioning measurement quantity or perform compensation based on the single piece of LOS/NLOS indication information when calculating a position of the UE. Therefore, the position of the UE can be estimated more accurately, so as to avoid that the calculation accuracy of the position of the UE is adversely affected by the NLOS, thereby improving the positioning accuracy of the position of the UE estimated by the LMF, and overcoming the problem of increasing signaling overhead for reporting two pieces of LOS/NLOS indication information.

Example 4 (Value Range of LOS/NLOS Indication Information)

In Example 4, for a certain positioning measurement quantity, a UE or a TRP reports at least two pieces of LOS/NLOS indication information associated with the positioning measurement quantity to a positioning server, so as to assist the positioning server in completing the UE positioning. The LOS/NLOS indication information includes at least one piece of information: LOS, NLOS, a probability of LOS, or a probability of NLOS of a radio link corresponding to a certain measurement quantity in the measurement quantities.

Regarding the value range of the LOS/NLOS indication information, following cases are provided.

a) A UE or a TRP transmits second indication information to an LMF, the second indication information is used to indicate that the LOS/NLOS indication information is a hard value (the hard value is 0 or 1, 0 and 1 indicate LOS and NLOS, or NLOS and LOS, respectively), or a soft value (the soft value is a value within an interval [0, 1], indicating a LOS probability or an NLOS probability).

b) Regardless of whether the LOS/NLOS indication information is a hard value or a soft value, it includes at least one value of 0, 1, or NULL, where 0 and 1 indicate LOS or NLOS, and NULL indicates that the UE/TRP cannot provide the LOS/NLOS indication information. For example, a confidence level is not high enough, and the UE/TRP cannot provide sufficiently credible LOS/NLOS indication information, so a value of NULL is provided.

c) In a case that the LOS/NLOS indication information is a soft value, then the soft value is indicated by N bits, indicating one of $2^N$ possible values in the interval [0, 1], where N is a preset positive integer.

d) In a case that the LOS/NLOS indication information is a soft value, then all candidate values of the soft value are predefined, for example, 8 possible values are: {0, 0.1, 0.3, 0.5, 0.7,0.9, 1, NULL}, as shown in Table 1:

TABLE 1

Mapping relation of 3 bits of LOS/NLOS indication information

| LOS/NLOS indication information (3 bits, 8 possible values) | Corresponding value | Explanation |
|---|---|---|
| 000 | 0 | LOS |
| 001 | 0.1 | LOS probability is 90% |
| 010 | 0.3 | LOS probability is 70% |
| 011 | 0.5 | LOS probability is 50% |
| 100 | 0.7 | LOS probability is 30% |
| 101 | 0.9 | LOS probability is 10% |
| 110 | 1 | NLOS |
| 111 | NULL | Disable to provide LOS/NLOS information |

With the method in this example, a UE/TRP can provide a probability value of LOS/NLOS, so that when calculating a position of the UE, an LMF can select to use an appropriate positioning measurement quantity or make compensation based on information of the probability of LOS/NLOS, which can more accurately estimate the position of the UE, and can prevent NLOS from affecting the calculation accuracy of the position of the UE, thereby improving the positioning accuracy of the position of the UE estimated by the LMF.

Example 5 (Confidence Level of LOS/NLOS Indication Information)

In Example 5, when reporting the LOS/NLOS indication information, the UE/TRP may also report a confidence level of the LOS/NLOS indication information measured by the UE/TRP at the same time, which is used to indicate the reliability degree of the LOS/NLOS indication information, and used by the LMF for reference. The confidence level is represented by a percentage. For example, a confidence level 95% for a certain piece of LOS/NLOS indication information reported by a UE corresponds to value 1.

The confidence level may also be indicated by preset M bits, indicating one of $2^M$ possible values in the interval [0, 1]. Alternatively, the confidence level is indicated by M bits, indicating one of $2^M$ possible values within the interval [0%, 100%], where M is a preset positive integer.

All candidate values of the confidence level may be predefined, for example, 8 possible values are: {10%, 20%, 30%, 50%, 70%, 80%, 90%, 100%}.

The reason for reporting the confidence level is that the LOS/NLOS indication information indicates whether a radio propagation path of a positioning reference signal between a UE and a TRP is LOS or NLOS, or indicates the probability of LOS or the probability of NLOS, and LOS/NLOS information is obtained by a receiver by calculating some radio characteristics of a received signal, such as the Rice factor or channel frequency response of the received signal. However, it cannot ensure that the LOS/NLOS indication information obtained by this calculation is completely accurate, and there may be certain errors. Thus, the confidence level of the LOS/NLOS indication information is further introduced.

Figure 7:
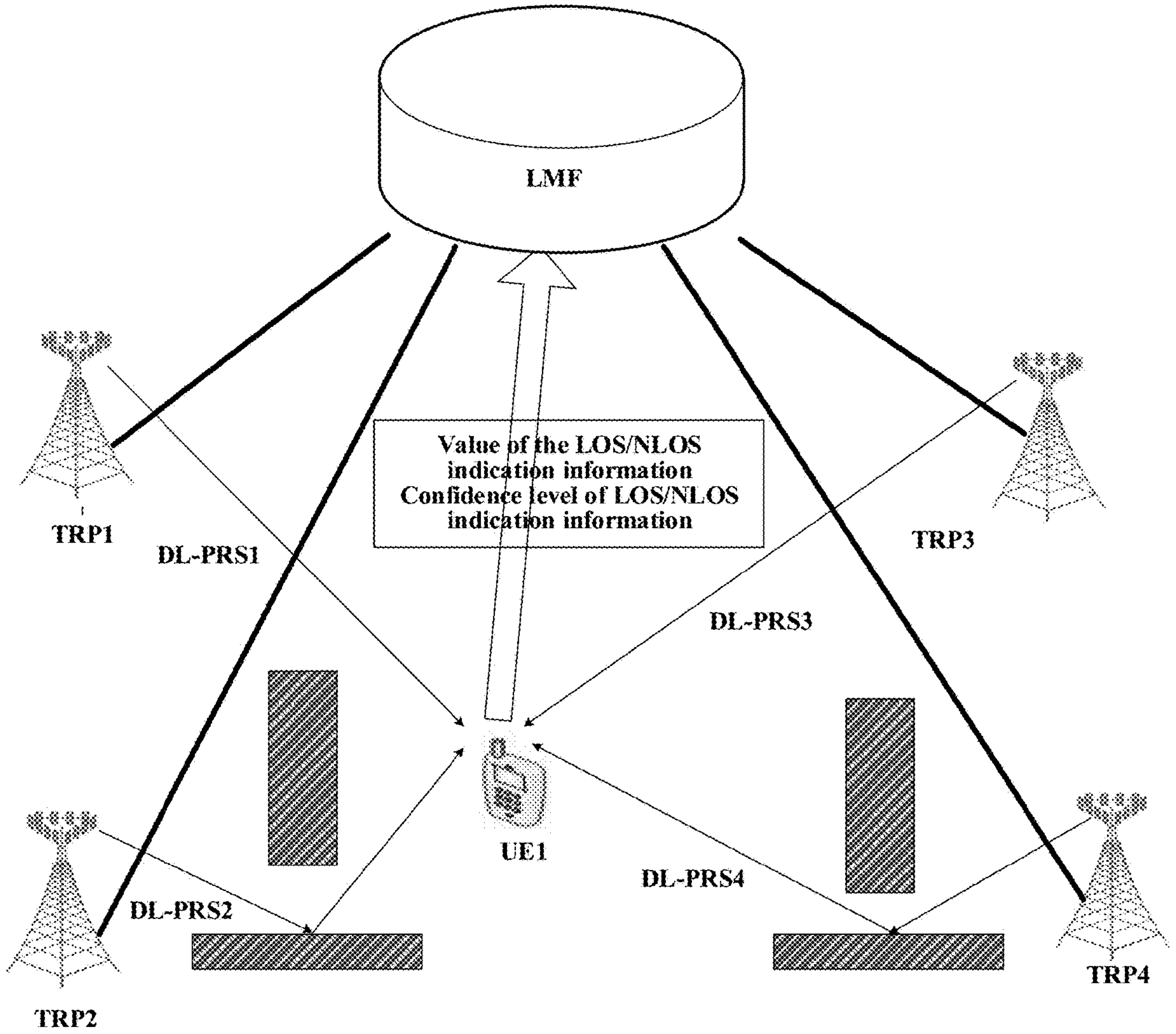
FIG. 7 is a schematic diagram of an application scenario of Example 5 provided by an embodiment of the present disclosure.

As shown in FIG. 7, a UE/TRP reports a specific value of LOS/NLOS indication information and a confidence level of the LOS/NLOS indication information to an LMF at the same time. If the LMF finds that the confidence level is quite high, such as 95%, the LMF may fully refer to the LOS/NLOS indication information when selecting a positioning measurement quantity for positioning calculation or performing compensation on a measurement quantity. On the contrary, if the LMF finds that the confidence level is quite low, such as 15%, the LMF may discard the LOS/NLOS indication information. In addition, if the LMF receives multiple pieces of LOS/NLOS indication information, the LMF may select to use LOS/NLOS indication information with the highest confidence level.

With the method in the example, a UE/TRP can provide a confidence level of LOS/NLOS indication information, so that when calculating a position of the UE, an LMF can select and use an appropriate piece of LOS/NLOS indication information according to the confidence level of the LOS/NLOS indication information, which can more accurately estimate the position of the UE, and can prevent NLOS from affecting the calculation accuracy of the position of the UE, thereby improving the positioning accuracy of the position of the UE estimated by the LMF.

Example 6 (Signaling Design of LOS/NLOS Indication Information)

Figure 8:
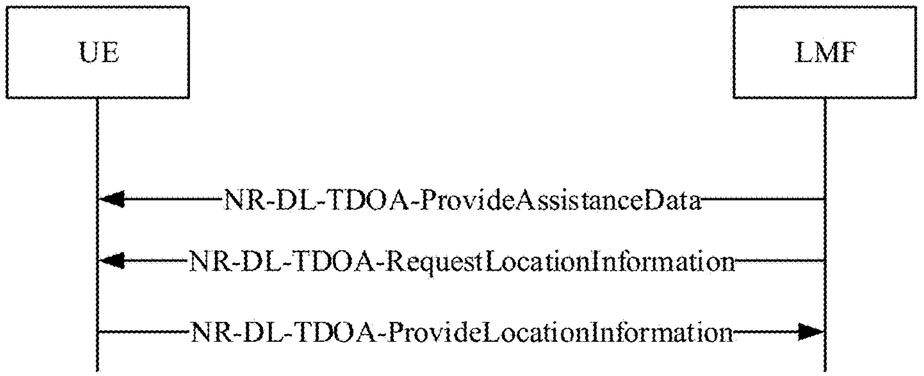
FIG. 8 is a schematic diagram of an application scenario of Example 6 provided by an embodiment of the present disclosure.

As shown in FIG. 8, in Example 6, when a UE reports a DL RSTD measurement quantity in a LTE positioning protocol (LTE Positioning Protocol, LPP) signaling for the DL-TDOA positioning method, the UE further reports LOS/NLOS indication information in the following specific signaling.

The UE reports the LOS/NLOS indication information in the "Provide Location Information (NR-DL-TDOA-ProvideLocationInformation-r17)" information element (IE). Specifically, the UE reports LOS/NLOS indication information of a DL-PRS of a measurement time or a reference TRP in the "Signal Measurement Information (NR-DL-TDOA-SignalMeasurementInformation-r17)" information element (IE).

The UE reports LOS/NLOS indication information of a DL-PRS of a first DL-TDOA measurement quantity or a first TRP in the "Measurement Element (NR-DL-TDOA-MeasElement-r17)".

The UE reports LOS/NLOS indication information of DL-PRSs of other three DL-TDOA measurement quantities or TRPs in the "Additional Measurements (NR-DL-TDOA-AdditionalMeasurements-r17)".

With the method in this example, a UE can provide LOS/NLOS indication information in a LPP signaling, so that when calculating a location of the UE, the LMF can select and use an appropriate RSTD measurement quantity or perform compensation according to the LOS/NLOS indication information, which can more accurately estimate the position of the UE, and can prevent NLOS from affecting the calculation accuracy of the position of the UE, thereby improving the positioning accuracy of the position of the UE estimated by the LMF.

Example 7 (LOS/NLOS Indication Information Associated with "UE-TRP Pair")

In Example 7, a UE/TRP separately reports each piece of LOS/NLOS indication information, the LOS/NLOS indication information indicates the LOS probability (or the NLOS probability) between the UE and the TRP, and is associated with one UE-TRP pair. The UE-TRP pair includes one UE and one TRP, which is not associated with a specific positioning measurement quantity and thus is applicable to all positioning measurement quantities.

Specifically, in Example 6, the LOS/NLOS indication information is associated with a specific positioning measurement quantity, and a specific value of the indication information is reported together with the specific positioning measurement quantity (i.e., DL-RSTD). The reporting of the indication information is dependent on the reporting of the positioning measurement quantity. However, in Example 7, the LOS/NLOS indication information is not associated with a specific positioning measurement quantity, and has the wider applicability. The LOS/NLOS indication information is associated with one "UE-TRP pair" including one UE and one TRP, and thus applies to all positioning measurement quantities.

In addition, the LOS/NLOS indication information may also be reported jointly with TEG or reported independently. That is, the indication information may be reported jointly with reception-transmission timing error information or reported independently.

In various positioning methods in the existing protocols, when positioning time measurement quantities such as DL-RSTD, UE reception-transmission time difference, or gNB reception-transmission time difference are calculated, it is assumed in the protocols that time measurement is performed at a position of antenna connector (Antenna Connector). However, in fact, the time measurement position of a signal is in a baseband unit, so there may be a time measurement error, which exists for both signal transmission and signal reception, and is referred to as a reception-transmission timing error. The existence of the reception-transmission timing error may lead to inaccurate measurement results of all time-based positioning measurement quantities including DL-RSTD, UE reception-transmission time difference, or gNB reception-transmission time difference, thereby affecting the final positioning accuracy.

TEG refers to reception-transmission timing error group (Timing Error Group, TEG), which belongs to a kind of reception-transmission timing error information. TEG is to place the reception-transmission timing errors within a certain value range into multiple groups, each of which is used to indicate a specific range of reception-transmission timing errors. Indicating the TEG is a scheme for indicating the reception-transmission timing errors.

By using the method in this example, LOS/NLOS indication information reported by a UE is associated with a specific "UE-TRP pair", is not associated with a specific positioning measurement quantity, and is applicable to all positioning measurement quantities. Thus, there is no need to report LOS/NLOS indication information for each measurement quantity, and the reporting overhead is relatively low.

It can be seen from the above examples that, as compared with the related art, in the method for transmitting LOS/NLOS indication information according to the embodiments of the present disclosure, a UE or TRP can report, for a certain positioning measurement quantity, at least two pieces of LOS/NLOS indication information associated with the positioning measurement quantity to a positioning server LMF, to assist the positioning server in positioning of the UE, so that the LMF can select and use an appropriate positioning measurement quantity or perform compensation based on multiple pieces of LOS/NLOS indication information when calculating a position of the UE. Therefore, the position of the UE can be estimated more accurately, so as to avoid that the calculation accuracy of the position of the UE is adversely affected by the NLOS, thereby improving the positioning accuracy of the position of the UE estimated by the LMF.

Various methods in the embodiments of the present disclosure have been introduced above. Apparatuses for implementing the above methods will be further provided below.

Figure 9:
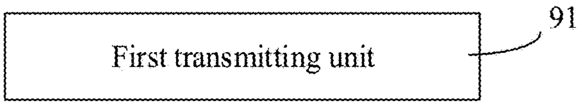
FIG. 9 is a schematic structural diagram of a first device provided by an embodiment of the present disclosure.
Figure 10:
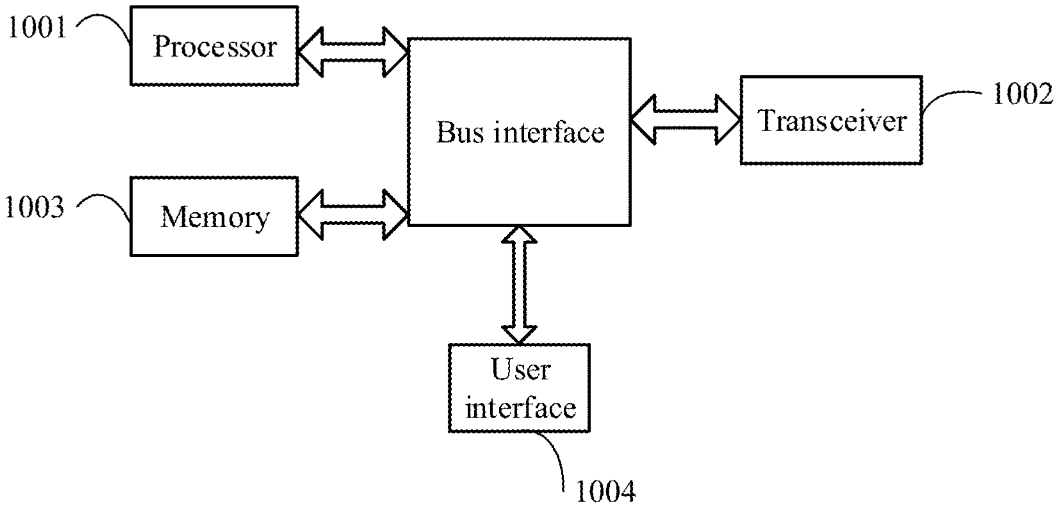
FIG. 10 is another schematic structural diagram of a first device provided by the embodiment of the present disclosure.

Referring to FIG. 9, an embodiment of the present disclosure provides a first device. The first device may specifically be at least one device among a UE, a base station, or a TRP. As shown in FIG. 10, the first device includes: a first transmitting unit 91, configured to transmit LOS/NLOS indication information corresponding to a positioning measurement quantity to a positioning server, where the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

Optionally, the first device further includes: a second transmitting unit, configured to transmit the positioning measurement quantity to the positioning server, where the positioning measurement quantity and the LOS/NLOS indication information corresponding to the positioning measurement quantity are used for positioning by the positioning server.

Optionally, the first transmitting unit is further configured to: for one positioning measurement quantity, transmit at least two pieces of LOS/NLOS indication information corresponding to the positioning measurement quantity to the positioning server, where the positioning measurement quantity is associated with at least two measurement objects, and each piece of LOS/NLOS indication information is associated with a radio link associated with one of the measurement objects.

Optionally, the positioning measurement quantity is a downlink reference signal time difference (DL-RSTD) measurement quantity; the at least two measurement objects include: a reference measurement object and a relative measurement object; where the reference measurement object is a reference TRP, and the relative measurement object is a measurement TRP; or, the reference measurement object is a reference time, and the relative measurement object is a measurement time or downlink time difference of arrival (DL-TDOA).

Optionally, the first transmitting unit is further configured to transmit, when transmitting at least one positioning measurement quantity, LOS/NLOS indication information of a radio link associated with a same reference measurement object to the positioning server, and for each relative measurement object, transmit one piece of LOS/NLOS indication information of a radio link associated with the relative measurement object.

Optionally, LOS/NLOS indication information of a radio link associated with the reference measurement object is carried in a first information element (IE), and the first information element (IE) includes signal measurement information (NR-DL-TDOA-SignalMeasurementInformation-r17); and LOS/NLOS indication information of a radio link associated with a first relative measurement object is carried in a measurement element signaling (NR-DL-TDOA-MeasElement-r17); LOS/NLOS indication information of radio links associated with the remaining relative measurement objects are carried in an additional measurement element signaling (NR-DL-TDOA-AdditionalMeasurements-r17).

Optionally, the positioning measurement quantity is a measurement quantity of a reception-transmission time difference of the UE; and the at least two measurement objects include: a first downlink positioning reference signal (DL-PRS) and a first sounding reference signal for positioning (SRS-Pos).

Optionally, the first transmitting unit is further configured to transmit, by the UE, LOS/NLOS indication information of a radio link associated with the first DL-PRS to the positioning server, and transmit, through the TRP, LOS/NLOS indication information of a radio link associated with the first SRS-Pos to the positioning server.

Optionally, the positioning measurement quantity is a measurement quantity of a reception-transmission time difference of the TRP; and the at least two measurement objects include: a second DL-PRS and a second SRS-Pos.

Optionally, the first transmitting unit is further configured to transmit, through the UE, LOS/NLOS indication information of a radio link associated with the second DL-PRS to the positioning server, and transmit, through the TRP, LOS/NLOS indication information of a radio link associated with the second SRS-Pos to the positioning server.

Optionally, the first transmitting unit is further configured to generate one piece of first LOS/NLOS indication information based on LOS/NLOS indication information corresponding to the at least one positioning measurement quantity, and transmit the same to the positioning server, when transmitting at least one positioning measurement quantity.

Optionally, the first transmitting unit is further configured to generate one piece of first LOS/NLOS indication information according to any of the following:

- in a case that the LOS or NLOS attribute is the probability of LOS or the probability of NLOS, a probability indicated by the first LOS/NLOS indication information is positively correlated with a minimum value among probabilities of LOS, or is positively correlated with a maximum value among probabilities of NLOS;
- in a case that the LOS or NLOS attribute is the LOS or the NLOS, only when all pieces of LOS/NLOS indication information corresponding to the at least one positioning measurement quantity indicate the LOS, the first LOS/NLOS indication information indicates the LOS; otherwise, the first LOS/NLOS indication information indicates the NLOS;
- in a case that the LOS or NLOS attribute is the probability of LOS or the probability of NLOS, a probability indicated by the first LOS/NLOS indication information is a preset function with the LOS/NLOS indication information corresponding to the at least one positioning measurement quantity as a variable.

Optionally, the first device further includes: a third transmitting unit, configured to transmit first indication information to the positioning server, where the first indication information is used to indicate that the LOS/NLOS indication information is a hard value or a soft value, the hard value includes that the LOS or NLOS attribute is the LOS or the NLOS, and the soft value includes that the LOS or NLOS attribute is the probability of LOS or the probability of NLOS.

Optionally, a value range of the LOS/NLOS indication information includes: at least one of 0, 1, or null, where, 0 indicates the LOS and 1 indicates the NLOS, or, 0 indicates the NLOS and 1 indicates the LOS; the null indicates that the LOS or NLOS attribute is unknown.

Optionally, in a case that the LOS/NLOS indication information is the soft value, the LOS/NLOS indication information is indicated by using N bits, and N is a preset positive integer; each value of the N bits corresponds to one of $2^N$ values or subintervals within an interval [0, 1]; in a case that the soft value is the probability of LOS, the probability of LOS is positively correlated with the soft value; in a case that the soft value is the probability of NLOS, the probability of NLOS is positively correlated with the soft value.

Optionally, each value or each interval in the interval [0, 1] is predefined, and a correspondence between each value of the N bits and one of values or subintervals in the interval [0, 1] is also predefined.

Optionally, the first device further includes: a fourth transmitting unit, configured to transmit second indication information to the positioning server, where the second indication information is used to indicate a confidence level of the LOS/NLOS indication information.

Optionally, the confidence level is indicated by using M bits, and M is a preset positive integer; each value of the M bits corresponds to one of $2^M$ values in an interval [0%, 100%].

Optionally, each value in the interval [0%, 100%] is predefined, and each value of the M bits, and a correspondence between each value of the N bits and one of values in the interval [0%, 100%] is also predefined.

Optionally, the LOS/NLOS indication information is associated with all positioning measurement quantities of one UE-TRP pair, and the UE-TRP pair includes one UE and one TRP.

It should be noted that the apparatus in this embodiment corresponds to the above method shown in FIG. 2, and the implementations in the above embodiments are applicable to this apparatus embodiment, which can also achieve the same technical effects. The above apparatus provided by the embodiment of the present disclosure can implement all the method steps implemented by the above-mentioned method embodiments, and can achieve the same technical effects. Therefore, the descriptions and beneficial effects of this embodiment that are the same as the method embodiments will not be repeated here in detail.

Reference is made to FIG. 10, which is another schematic structural diagram of a first device provided by an embodiment of the present disclosure. The first device includes: a processor 1001, a transceiver 1002, a memory 1003, a user interface 1004 and a bus interface.

In an embodiment of the present disclosure, the first device further includes: a program stored in the memory 1003 and executable on the processor 1001.

The transceiver 1002 is configured to transmit and receive data under the control of the processor;

The processor 1001 is configured to read the computer program in the memory and perform the following operations: transmitting LOS/NLOS indication information corresponding to a positioning measurement quantity to a positioning server, where the first device includes at least one device of a UE, a base station, or a transmit and receive point (TRP), the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

Optionally, the processor is further configured to read the computer program in the memory to perform the following operations: transmitting the positioning measurement quantity to the positioning server, where the positioning measurement quantity and the LOS/NLOS indication information corresponding to the positioning measurement quantity are used for positioning by the positioning server.

Optionally, the processor is further configured to read the computer program in the memory and perform the following operations: for one positioning measurement quantity, transmitting, by the first device, at least two pieces of LOS/NLOS indication information corresponding to the positioning measurement quantity to the positioning server, where the positioning measurement quantity is associated with at least two measurement objects, and each piece of LOS/NLOS indication information is associated with a radio link associated with one of the measurement objects.

Optionally, the positioning measurement quantity is a downlink reference signal time difference (DL-RSTD) measurement quantity; the at least two measurement objects include: a reference measurement object and a relative measurement object; where the reference measurement object is a reference TRP, and the relative measurement object is a measurement TRP; or, the reference measurement object is a reference time, and the relative measurement object is a measurement time or downlink time difference of arrival (DL-TDOA).

Optionally, the processor is further configured to read the computer program in the memory and perform the following operations: when transmitting at least one positioning measurement quantity, transmitting LOS/NLOS indication information of a radio link associated with a same reference measurement object to the positioning server, and for each of the relative measurement object, transmitting one piece of LOS/NLOS indication information of a radio link associated with the relative measurement object.

Optionally, LOS/NLOS indication information of a radio link associated with the reference measurement object is carried in a first information element (IE), and the first information element (IE) includes signal measurement information NR-DL-TDOA-SignalMeasurementInformation-r17; and LOS/NLOS indication information of a radio link associated with a first relative measurement object is carried in a measurement element signaling NR-DL-TDOA-MeasElement-r17; LOS/NLOS indication information of radio links associated with the remaining relative measurement objects are carried in an additional measurement element signaling NR-DL-TDOA-AdditionalMeasurements-r17.

Optionally, the positioning measurement quantity is a measurement quantity of a reception-transmission time difference of the UE; and the at least two measurement objects include: a first downlink positioning reference signal (DL-PRS) and a first sounding reference signal for positioning (SRS-Pos).

Optionally, the processor is further configured to read the computer program in the memory and perform the following operations: transmitting, by the UE, LOS/NLOS indication information of a radio link associated with the first DL-PRS to the positioning server, and transmitting, by the TRP, LOS/NLOS indication information of a radio link associated with the first SRS-Pos to the positioning server.

Optionally, the positioning measurement quantity is a measurement quantity of a reception-transmission time difference of the TRP; and the at least two measurement objects include: a second DL-PRS and a second SRS-Pos.

Optionally, the processor is further configured to read the computer program in the memory and perform the following operations: transmitting, by the UE, LOS/NLOS indication information of a radio link associated with the second DL-PRS to the positioning server, and transmitting, by the TRP, LOS/NLOS indication information of a radio link associated with the second SRS-Pos to the positioning server.

Optionally, the processor is further configured to read the computer program in the memory and perform the following operations: when transmitting at least one positioning measurement quantity, generating one piece of first LOS/NLOS indication information based on LOS/NLOS indication information corresponding to the at least one positioning measurement quantity, and transmitting the same to the positioning server.

Optionally, the processor is further configured to read the computer program in the memory and perform the following operations: generating one piece of first LOS/NLOS indication information based on any one of the following:

in a case that the LOS or NLOS attribute is the probability of LOS or the probability of NLOS, a probability indicated by the first LOS/NLOS indication information is positively correlated with a minimum value of the probability of LOS, or is positively correlated with a maximum value of the probability of NLOS;

in a case that the LOS or NLOS attribute is the LOS or the NLOS, only when all pieces of LOS/NLOS indication information corresponding to the at least one positioning measurement quantity indicate the LOS, the first LOS/NLOS indication information indicates the LOS; otherwise, the first LOS/NLOS indication information indicates the NLOS;

in a case that the LOS or NLOS attribute is the probability of LOS or the probability of NLOS, a probability indicated by the first LOS/NLOS indication information is a preset function with the LOS/NLOS indication information corresponding to the at least one positioning measurement quantity as a variable.

Optionally, the processor is further configured to read the computer program in the memory to perform the following operations.

Optionally, the processor is further configured to read the computer program in the memory to perform the following operations: transmitting first indication information to the positioning server, where the first indication information is used to indicate that the LOS/NLOS indication information is a hard value or a soft value, the hard value includes that the LOS or NLOS attribute is the LOS or the NLOS, and the soft value includes that the LOS or NLOS attribute is the probability of LOS or the probability of NLOS.

Optionally, a value range of the LOS/NLOS indication information includes: at least one of 0, 1, or null, where, 0 indicates the LOS and 1 indicates the NLOS, or, 0 indicates the NLOS and 1 indicates the LOS; the null indicates that the LOS or NLOS attribute is unknown.

Optionally, in a case that the LOS/NLOS indication information is a soft value, the LOS/NLOS indication information is indicated by using N bits, and N is a preset positive integer; each value of the N bits corresponds to one of $2^N$ values or subintervals within an interval [0, 1]; in a case that the soft value is the probability of LOS, the probability of LOS is positively correlated with the soft value; in a case that the soft value is the probability of NLOS, the probability of NLOS is positively correlated with the soft value.

Optionally, each value or interval in the interval [0, 1] is predefined, and each value of the N bits is related to each value or interval in the interval [0, 1] Correspondence is also predefined.

Optionally, the first device further includes:

Optionally, the processor is further configured to read the computer program in the memory and perform the following operations: transmitting second indication information to the positioning server, where the second indication information is used to indicate a confidence level of the LOS/NLOS indication information.

Optionally, the confidence level is indicated by using M bits, and M is a preset positive integer; each value of the M bits corresponds to one of $2^M$ values in an interval [0%, 100%].

Optionally, each value in the interval [0%, 100%] is predefined, and a correspondence between each value of the M bits and one value in the interval [0%, 100%] is also predefined.

Optionally, the LOS/NLOS indication information is associated with all positioning measurement quantities of one UE-TRP pair, and the UE-TRP pair includes one UE and one TRP.

It can be understood that, in the embodiment of the present disclosure, when the computer program is executed by the processor 1001, the various processes of the above-mentioned method embodiments shown in FIG. 2 can be realized, and the same technical effects can be achieved, which will not be described here to avoid repetition.

In FIG. 10, the bus architecture may include any number of interconnected buses and bridges. Specifically, various circuits of one or more processors represented by the processor 1001 and a memory represented by the memory 1003 are linked together. The bus architecture may also link various other circuits such as peripheral devices, voltage regulators, power management circuits, etc., which are well-known in the art, and therefore, no further descriptions are provided herein. The bus interface provides an interface. The transceiver 1002 may be a plurality of elements, that is, include a transmitter and a receiver, and provide a unit for communicating with various other devices on a transmission medium. For different user equipment, the user interface 1004 may also be an interface capable of externally or internally connecting to required equipment. The connected equipment includes but not limited to a keypad, a display, a speaker, a microphone, a joystick, and the like.

The processor 1001 is responsible for managing the bus architecture and general processing, and the memory 1003 can store data used by the processor 1001 when performing operations.

It should be noted that the apparatus in this embodiment corresponds to the above method shown in FIG. 2, and the implementations in the above embodiments are all applicable to the apparatus embodiments, and can also achieve the same technical effects. In this apparatus, the transceiver 1002 and the memory 1003, or the transceiver 1002 and the processor 1001 can be connected through a bus interface, the function of the processor 1001 can also be implemented by the transceiver 1002, and the function of the transceiver 1002 can also be implemented by the processor 1001. It should be noted that the above apparatus provided by the embodiment of the present disclosure can implement all the method steps implemented by the above method embodiments, and can achieve the same technical effects. Therefore, the descriptions and beneficial effects of this embodiment that are the same as the method embodiments will not be repeated here in detail.

In some embodiments of the present disclosure, a computer-readable storage medium is further provided, on which a program is stored, and when the program is executed by a processor, the following steps are implemented: transmitting LOS/NLOS indication information corresponding to a positioning measurement quantity to a positioning server, where the first device includes at least one device of a UE, a base station, or a transmit and receive point (TRP), the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

When the program is executed by the processor, it can realize all the implementations in the methods for transmitting and receiving LOS/NLOS indication information applied to the first device, and can achieve the same technical effects, which will not be described here to avoid repetition.

Figure 11:
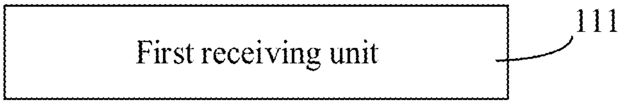
FIG. 11 is a schematic structural diagram of a positioning server provided by an embodiment of the present disclosure.

An embodiment of the present disclosure provides a positioning server as shown in FIG. 11, including: a first receiving unit 111, configured to receive LOS/NLOS indication information corresponding to a positioning measurement quantity transmitted by a first device, where the first device includes at least one device of a UE, a base station, or a TRP, the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

Optionally, the first receiving unit is further configured to receive at least two pieces of LOS/NLOS indication information corresponding to one positioning measurement quantity transmitted by the first device for the positioning measurement quantity, where the positioning measurement quantity is associated with at least two measurement objects, and each piece of LOS/NLOS indication information is associated with a radio link associated with one of the measurement objects.

Optionally, the positioning measurement quantity is a DL-RSTD measurement quantity; the at least two measurement objects include: a reference measurement object and a relative measurement object; where the reference measurement object is a reference TRP, and the relative measurement object is a measurement TRP; or, the reference measurement object is a reference time, and the relative measurement object is a measurement time or downlink time difference of arrival (DL-TDOA).

Optionally, the first receiving unit is further configured to: when receiving at least one positioning measurement quantity, receive, from the first device, LOS/NLOS indication information of a radio link associated with a same reference measurement object, and receive, from the first device for each relative measurement object, one piece of LOS/NLOS indication information of a radio link associated with the relative measurement object.

Optionally, the positioning measurement quantity is a measurement quantity of a reception-transmission time difference of the UE; and the at least two measurement objects include: a first DL-PRS and a first SRS-Pos.

Optionally, the first receiving unit is further configured to receive LOS/NLOS indication information of a radio link associated with the first DL-PRS transmitted by the UE, and receiving LOS/NLOS indication information of a radio link associated with the first SRS-Pos transmitted by the TRP.

Optionally, the positioning measurement quantity is a measurement quantity of a reception-transmission time difference of the TRP; and the at least two measurement objects include: a second DL-PRS and a second SRS-Pos.

Optionally, the first receiving unit is further configured to receive LOS/NLOS indication information of a radio link associated with the second DL-PRS transmitted by the UE, and receiving LOS/NLOS indication information of a radio link associated with the second SRS-Pos transmitted by the TRP.

Optionally, the first receiving unit is further configured to: when receiving at least one positioning measurement quantity, receive first LOS/NLOS indication information transmitted by the first device, where the first LOS/NLOS indication information is generated based on LOS/NLOS indication information corresponding to the at least one positioning measurement quantity.

Optionally, the positioning server further includes: a second receiving unit is configured to receive first indication information transmitted by the first device, where the first indication information is used to indicate that the LOS/NLOS indication information is a hard value or a soft value, the hard value includes that the LOS or NLOS attribute is the LOS or the NLOS, and the soft value includes that the LOS or NLOS attribute is the probability of LOS or the probability of NLOS.

Optionally, the positioning server further includes: a third receiving unit, configured to receive second indication information transmitted by the first device, where the second indication information is used to indicate a confidence level of the LOS/NLOS indication information.

Optionally, the LOS/NLOS indication information is associated with all positioning measurement quantities of one UE-TRP pair, and the UE-TRP pair includes one UE and one TRP.

It should be noted that the apparatus in this embodiment corresponds to the above method shown in FIG. 3, and the implementation manners in the above embodiments are applicable to this apparatus embodiment, and can also achieve the same technical effects. It should be noted that the above apparatus provided by the embodiment of the present disclosure can implement all the method steps implemented by the above method embodiments, and can achieve the same technical effects. Therefore, the descriptions and beneficial effects of this embodiment that are the same as the method embodiments will not be repeated here in detail.

Figure 12:
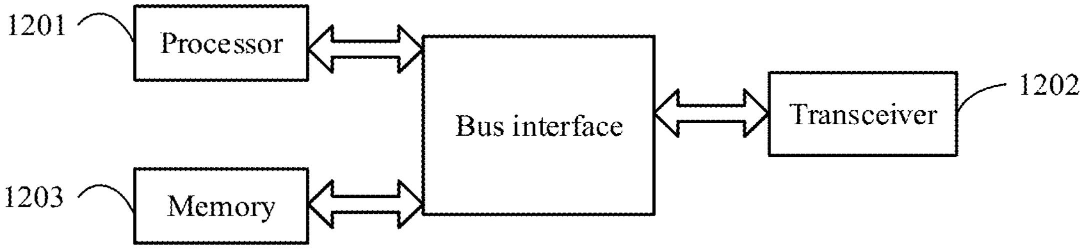
FIG. 12 is another schematic structural diagram of a positioning server provided by an embodiment of the present disclosure.

Reference is made to FIG. 12, which is a schematic structural diagram of a positioning server according to an embodiment of the present disclosure. The positioning server includes: a processor 1201, a transceiver 1202, a memory 1203 and a bus interface.

In the embodiment of the present disclosure, the positioning server further includes: a program stored in the memory 1203 and executable on the processor 1201.

The transceiver 1002 is configured to transmit and receive data under the control of the processor.

The processor 1001 is configured to read the computer program in the memory to perform the following operations: receiving LOS/NLOS indication information corresponding to a positioning measurement quantity transmitted by a first device, where the first device includes at least one device of a UE, a base station, or a TRP, the LOS/NLOS indication information is used to indicate a LOS or NLOS attribute of a radio link associated with the positioning measurement quantity, and the LOS or NLOS attribute includes at least one of the following: a LOS, an NLOS, a probability of LOS or a probability of NLOS.

Optionally, the processor is further configured to read the computer program in the memory and perform the following operations: receiving at least two pieces of LOS/NLOS indication information corresponding to one positioning measurement quantity transmitted by the first device for the positioning measurement quantity, where the positioning measurement quantity is associated with at least two measurement objects, and each piece of LOS/NLOS indication information is associated with a radio link associated with one of the measurement objects.

Optionally, the positioning measurement quantity is a DL-RSTD measurement quantity; and the at least two measurement objects include: a reference measurement object and a relative measurement object; where the reference measurement object is a reference TRP, and the relative measurement object is a measurement TRP; or, the reference measurement object is a reference time, and the relative measurement object is a measurement time or downlink time difference of arrival (DL-TDOA).

Optionally, the processor is further configured to read the computer program in the memory and perform the following operations: when receiving at least one positioning measurement quantity, receiving, from the first device, LOS/NLOS indication information of a radio link associated with a same reference measurement object, and receiving, from the first device for each relative measurement object, one piece of LOS/NLOS indication information of a radio link associated with the relative measurement object.

Optionally, the positioning measurement quantity is a measurement quantity of a reception-transmission time difference of the UE; and the at least two measurement objects include: a first DL-PRS and a first SRS-Pos.

Optionally, the processor is further configured to read the computer program in the memory and perform the following operations: receiving LOS/NLOS indication information of a radio link associated with the first DL-PRS transmitted by the UE, and receiving LOS/NLOS indication information of a radio link associated with the first SRS-Pos transmitted by the TRP.

Optionally, the positioning measurement quantity is a measurement quantity of a reception-transmission time difference of the TRP; and the at least two measurement objects include: a second DL-PRS and a second SRS-Pos.

Optionally, the processor is further configured to read the computer program in the memory and perform the following operations: receiving LOS/NLOS indication information of a radio link associated with the second DL-PRS transmitted by the UE, and receiving LOS/NLOS indication information of a radio link associated with the second SRS-Pos transmitted by the TRP.

Optionally, the processor is further configured to read the computer program in the memory and perform the following operations: when receiving at least one positioning measurement quantity, receiving first LOS/NLOS indication information transmitted by the first device, where the first LOS/NLOS indication information is generated based on LOS/NLOS indication information corresponding to the at least one positioning measurement quantity.

Optionally, the processor is further configured to read the computer program in the memory and perform the following operations: receiving first indication information transmitted by the first device, where the first indication information is used to indicate that the LOS/NLOS indication information is a hard value or a soft value, the hard value includes that the LOS or NLOS attribute is the LOS or the NLOS, and the soft value includes that the LOS or NLOS attribute is the probability of LOS or the probability of NLOS.

Optionally, the processor is further configured to read the computer program in the memory and perform the following operations: receiving second indication information transmitted by the first device, where the second indication information is used to indicate a confidence level of the LOS/NLOS indication information.

Optionally, the LOS/NLOS indication information is associated with all positioning measurement quantities of one UE-TRP pair, and the UE-TRP pair includes one UE and one TRP.

It can be appreciated that, in the embodiments of the present disclosure, when the computer program is executed by the processor 1201, various processes of the above-mentioned method embodiments shown in FIG. 3 can be implemented, and the same technical effects can be achieved, which will not described to avoid repetition.

In FIG. 12, the bus architecture may include any number of interconnected buses and bridges. Specifically, various circuits of one or more processors represented by the processor 1201 and a memory represented by the memory 1203 are linked together. The bus architecture may also link various other circuits such as peripheral devices, voltage regulators, power management circuits, etc., which are well-known in the art, and therefore, no further descriptions are provided herein. The bus interface provides an interface. The transceiver 1202 may be a plurality of elements, that is, include a transmitter and a receiver, and provide a unit for communicating with various other devices on a transmission medium.

The processor 1201 is responsible for managing the bus architecture and general processing, and the memory 1203 can store data used by the processor 1201 when performing operations.

It should be noted that the terminal in this embodiment is a device corresponding to the above method shown in FIG. 3, and the implementation manners in the above embodiments are all applicable to this terminal embodiment, and can also achieve the same technical effects. In this apparatus, the transceiver 1202 and the memory 1203, or the transceiver 1202 and the processor 1201 can be connected through a bus interface, the function of the processor 1201 can also be implemented by the transceiver 1202, and the function of the transceiver 1202 can also be implemented by the processor 1201. It should be noted that the above apparatus provided by the embodiment of the present disclosure can implement all the method steps implemented by the above method embodiments, and can achieve the same technical effects. Therefore, the part and beneficial effects of this embodiment that are the same as the method embodiments will not be described here in detail.

In some embodiments of the present disclosure, a computer-readable storage medium is further provided, on which a program is stored, and when the program is executed by a processor, the following steps are implemented: receiving LOS/NLOS indication information corresponding to a positioning measurement quantity transmitted by a first device, where the first device includes at least one device of a UE, a base station, or a TRP, the LOS/NLOS indication information is used to indicate a LOS or NLOS attribute of a radio link associated with the positioning measurement quantity, and the LOS or NLOS attribute includes at least one of the following: a LOS, an NLOS, a probability of LOS, or a probability of NLOS.

When the program is executed by the processor, it can realize all the implementation manners in the method and apparatus for transmitting LOS/NLOS indication information and the method and apparatus for receiving LOS/NLOS indication information, and it can achieve the same technical effect, which will not be described here to avoid repetition.

Those skilled in the art may appreciate that the units and the algorithm steps described in conjunction with the embodiments according to the present disclosure may be implemented in the form of electronic hardware or a combination of computer software and electronic hardware. Whether these functions are performed in hardware or in software depends on the specific application and design constraints of the technical solution. Those skilled in the art may use different methods to implement the described functions for each particular application, and such implementations are not to be considered as departing from the scope of the present disclosure.

Those skilled in the art can clearly understand that, for the sake of easiness and conciseness of description, reference can be made to the corresponding processes in the foregoing method embodiments for specific operating processes of the systems, the apparatuses and the units described above, and a repeated description thereof is omitted herein.

It should be understood that in the embodiments according to the present disclosure, the disclosed device and method may be implemented in other ways. For example, the described embodiments directed to the device are merely exemplary. For example, the units are divided merely in logical function, which may be divided in another way in actual implementation, e.g., multiple units or components may be combined or integrated into another device, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The units described as separate components may or may not be physically separated, and the components shown as units may or may not be physical units, that is, they may be located in one place or distributed over multiple network units. Some or all of the units may be selected according to practical needs to achieve the objective of the technical solutions of the embodiments of the present disclosure.

In addition, functional units in various embodiments of the present disclosure may be integrated into one processing unit, or may be physically independent, or two or more units may be integrated into one unit.

If the function is implemented in the form of a software functional unit, and sold or used as a standalone product, it may be stored in a computer readable storage medium. Based on this understanding, essence of the technical solution of the present disclosure, or the part contributing to the related technologies, or part of the technical solution, may be embodied in the form of a software product. The computer software product is stored in a storage medium, and the software product includes a number of instructions to enable a computer device (which may be a personal computer, a server, or a network device, etc.) to perform all or part of the steps of method described in the various embodiments of the present disclosure. The storage medium includes a USB flash disk, a mobile hard disk, a ROM, a RAM, a magnetic disk, an optical disk, and other medium which can store program code.

The above descriptions merely illustrate specific implementations of the present disclosure, and the protection scope of the present disclosure is not limited thereto. Any modification or substitution made by those skilled in the art without departing from the technical scope of the present disclosure shall fall within the protection scope of the present disclosure. Therefore, the protection scope of the present disclosure shall be subjected to the scope of the claims.

What is claimed is:

1. A method for transmitting line of sight/non line of sight (LOS/NLOS) indication information, comprising:

transmitting, by a first device, LOS/NLOS indication information corresponding to a positioning measurement quantity to a positioning server, wherein the first device comprises at least one device of a user equipment (UE), a base station, or a transmit and receive point (TRP), the LOS/NLOS indication information is used to indicate a LOS or NLOS attribute of a radio link associated with the positioning measurement quantity, and the LOS or NLOS attribute comprises at least one of the following: a LOS, an NLOS, a probability of LOS or a probability of NLOS;

wherein the transmitting, by the first device, the LOS/NLOS indication information corresponding to the positioning measurement quantity to the positioning server comprises:

for one positioning measurement quantity, transmitting, by the first device, at least two pieces of LOS/NLOS indication information corresponding to the positioning measurement quantity to the positioning server, wherein the positioning measurement quantity is associated with at least two measurement objects, and each piece of LOS/NLOS indication information is associated with a radio link associated with one of the measurement objects;

wherein the at least two measurement objects comprise: a reference measurement object and a relative measurement object; wherein the reference measurement object is a reference TRP, and the relative measurement object is a measurement TRP; or, the reference measurement object is a reference time, and the relative measurement object is a measurement time or downlink time difference of arrival (DL-TDOA).

2. The method according to claim 1, further comprising: transmitting, by the first device, the positioning measurement quantity to the positioning server, wherein the positioning measurement quantity and the LOS/NLOS indication information corresponding to the positioning measurement quantity are used for positioning by the positioning server.

3. The method according to claim 1, wherein the positioning measurement quantity is a downlink reference signal time difference (DL-RSTD) measurement quantity.

4. The method according to claim 3, further comprising: when transmitting at least one positioning measurement quantity, transmitting LOS/NLOS indication information of a radio link associated with a same reference measurement object to the positioning server, and for each relative measurement object, transmitting one piece of LOS/NLOS indication information of a radio link associated with the relative measurement object.

5. The method according to claim 1, wherein, the positioning measurement quantity is a measurement quantity of a reception-transmission time difference of the UE; and the at least two measurement objects comprise: a first downlink positioning reference signal (DL-PRS) and a first sounding reference signal for positioning (SRS-Pos);

wherein the transmitting, by the first device, the at least two pieces of LOS/NLOS indication information corresponding to the positioning measurement quantity to the positioning server comprises:

transmitting, by the UE, LOS/NLOS indication information of a radio link associated with the first DL-PRS to the positioning server, and transmitting, by the TRP, LOS/NLOS indication information of a radio link associated with the first SRS-Pos to the positioning server;

or, wherein the positioning measurement quantity is a measurement quantity of a reception-transmission time difference of the TRP; and the at least two measurement objects comprise: a second downlink positioning reference signal (DL-PRS) and a second sounding reference signal for positioning (SRS-Pos);

wherein the transmitting, by the first device, the at least two pieces of LOS/NLOS indication information corresponding to the positioning measurement quantity to the positioning server comprises:

transmitting, by the UE, LOS/NLOS indication information of a radio link associated with the second DL-PRS to the positioning server, and transmitting, by the TRP, LOS/NLOS indication information of a radio link associated with the second SRS-Pos to the positioning server.

6. The method according to claim 1, wherein the transmitting, by the first device, the LOS/NLOS indication information corresponding to the positioning measurement quantity to the positioning server comprises:

when transmitting at least one positioning measurement quantity, generating one piece of first LOS/NLOS indication information based on LOS/NLOS indication information corresponding to the at least one positioning measurement quantity, and transmitting the same to the positioning server.

7. The method according to claim 6, wherein the generating one piece of first LOS/NLOS indication information based on the LOS/NLOS indication information corresponding to the at least one positioning measurement quantity comprises any one of the following:

in a case that the LOS or NLOS attribute is the probability of LOS or the probability of NLOS, a probability indicated by the first LOS/NLOS indication information is positively correlated with a minimum value among probabilities of LOS, or is positively correlated with a maximum value among probabilities of NLOS;

in a case that the LOS or NLOS attribute is the LOS or the NLOS, only when all pieces of LOS/NLOS indication information corresponding to the at least one positioning measurement quantity indicate the LOS, the first LOS/NLOS indication information indicates the LOS; otherwise, the first LOS/NLOS indication information indicates the NLOS;

in a case that the LOS or NLOS attribute is the probability of LOS or the probability of NLOS, a probability indicated by the first LOS/NLOS indication information is a preset function with the LOS/NLOS indication information corresponding to the at least one positioning measurement quantity as a variable.

8. The method according to claim 1, further comprising: transmitting, by the first device, first indication information to the positioning server, wherein the first indication information is used to indicate that the LOS/NLOS indication information is a hard value or a soft value, the hard value comprises that the LOS or NLOS attribute is the LOS or the NLOS, and the soft value comprises that the LOS or NLOS attribute is the probability of LOS or the probability of NLOS.

9. The method according to claim 8, wherein a value range of the LOS/NLOS indication information comprises: at least one of 0, 1, or null, wherein 0 indicates the LOS and 1 indicates the NLOS, or, 0 indicates the NLOS and 1 indicates the LOS; the null indicates that the LOS or NLOS attribute is unknown.

10. The method according to claim 1, further comprising: transmitting, by the first device, second indication information to the positioning server, wherein the second indication information is used to indicate a confidence level of the LOS/NLOS indication information;

wherein the confidence level is indicated by using M bits, and Mis a preset positive integer; each value of the M bits corresponds to one of $2^M$ values in an interval [0%, 100%].

11. The method according to claim 1, wherein the LOS/NLOS indication information is associated with all positioning measurement quantities of one UE-TRP pair, and the UE-TRP pair comprises one UE and one TRP.

12. A method for receiving LOS/NLOS indication information, comprising:

receiving, by a positioning server, LOS/NLOS indication information corresponding to a positioning measurement quantity transmitted by a first device, wherein the first device comprises at least one device of a user equipment (UE), a base station, or a transmit and receive point (TRP), the LOS/NLOS indication information is used to indicate a LOS or NLOS attribute of a radio link associated with the positioning measurement quantity, and the LOS or NLOS attribute comprises at least one of the following: a LOS, an NLOS, a probability of LOS or a probability of NLOS;

wherein the receiving the LOS/NLOS indication information corresponding to the positioning measurement quantity transmitted by the first device comprises:

receiving at least two pieces of LOS/NLOS indication information corresponding to one positioning measurement quantity transmitted by the first device for the positioning measurement quantity, wherein the positioning measurement quantity is associated with at least two measurement objects, and each piece of LOS/NLOS indication information is associated with a radio link associated with one of the measurement objects;

wherein the at least two measurement objects comprise: a reference measurement object and a relative measurement object; wherein the reference measurement object is a reference TRP, and the relative measurement object is a measurement TRP; or, the reference measurement object is a reference time, and the relative measurement object is a measurement time or downlink time difference of arrival (DL-TDOA).

13. The method according to claim 12, further comprising:

receiving, by the positioning server, the positioning measurement quantity transmitted by the first device; and performing positioning, by the positioning server, according to the positioning measurement quantity and the LOS/NLOS indication information corresponding to the positioning measurement quantity.

14. The method according to claim 12, wherein the positioning measurement quantity is a downlink reference signal time difference (DL-RSTD) measurement quantity; and wherein the receiving the LOS/NLOS indication information corresponding to the positioning measurement quantity transmitted by the first device further comprises:

when receiving at least one positioning measurement quantity, receiving, from the first device, LOS/NLOS indication information of a radio link associated with a same reference measurement object, and receiving, from the first device for each relative measurement object, one piece of LOS/NLOS indication information of a radio link associated with the relative measurement object.

15. The method according to claim 12, wherein the receiving the LOS/NLOS indication information corresponding to the positioning measurement quantity transmitted by the first device comprises:

receiving first LOS/NLOS indication information transmitted by the first device when receiving at least one positioning measurement quantity, wherein the first LOS/NLOS indication information is generated based on LOS/NLOS indication information corresponding to the at least one positioning measurement quantity;

and/or, wherein the method further comprises:

receiving first indication information transmitted by the first device, wherein the first indication information is used to indicate that the LOS/NLOS indication information is a hard value or a soft value, the hard value comprises that the LOS or NLOS attribute is the LOS or the NLOS, and the soft value comprises that the LOS or NLOS attribute is the probability of LOS or the probability of NLOS.

16. The method according to claim 12, wherein the LOS/NLOS indication information is associated with all positioning measurement quantities of one UE-TRP pair, and the UE-TRP pair comprises one UE and one TRP.

17. A positioning server, comprising a memory, a transceiver and a processor, wherein, the memory is configured to store a computer program;

the transceiver is configured to transmit and receive data under the control of the processor;

the processor is configured to read the computer program in the memory to perform the method according to claim 12.

18. A first device, wherein the first device comprises at least one device of a user equipment (UE), a base station, or a transmit and receive point (TRP), and the first device comprises a memory, a transceiver and a processor, wherein, the memory is configured to store a computer program;

the transceiver is configured to transmit and receive data under the control of the processor;

the processor is configured to read the computer program in the memory to perform:

transmitting LOS/NLOS indication information corresponding to a positioning measurement quantity to a positioning server, wherein the LOS/NLOS indication information is used to indicate a LOS or NLOS attribute of a radio link associated with the positioning measurement quantity, and the LOS or NLOS attribute comprises at least one of the following: a LOS, an NLOS, a probability of LOS or a probability of NLOS; and the processor is configured to read the computer program in the memory to perform:

for one positioning measurement quantity, transmitting at least two pieces of LOS/NLOS indication information corresponding to the positioning measurement quantity to the positioning server, wherein the positioning measurement quantity is associated with at least two measurement objects, and each piece of LOS/NLOS indication information is associated with a radio link associated with one of the measurement objects;

wherein the at least two measurement objects comprise: a reference measurement object and a relative measurement object; wherein the reference measurement object is a reference TRP, and the relative measurement object is a measurement TRP; or, the reference measurement object is a reference time, and the relative measurement object is a measurement time or downlink time difference of arrival (DL-TDOA).

19. The first device according to claim 18, wherein the positioning measurement quantity is a downlink reference signal time difference (DL-RSTD) measurement quantity.

20. The first device according to claim 19, wherein the processor is further configured to read the computer program in the memory to perform:

when transmitting at least one positioning measurement quantity, transmitting LOS/NLOS indication information of a radio link associated with a same reference measurement object to the positioning server, and for each relative measurement object, transmitting one piece of LOS/NLOS indication information of a radio link associated with the relative measurement object.

* * * * *